(12) United States Patent
McConnell et al.

(10) Patent No.: US 7,160,113 B2
(45) Date of Patent: *Jan. 9, 2007

(54) MOBILE TEACHING SYSTEM

(75) Inventors: Evan McConnell, Fairfax Station, VA (US); Joseph Caporaletti, Nokesville, VA (US); Robert G. Vanderlip, Centreville, VA (US); Anthony Tomarchio, Manassas, VA (US); Bryan Smith, Manassas, VA (US)

(73) Assignee: Earthwalk Communication, Inc., Manassas, VA (US)

( * ) Notice: Subject to any disclaimer, the term of this patent is extended or adjusted under 35 U.S.C. 154(b) by 28 days.

This patent is subject to a terminal disclaimer.

(21) Appl. No.: 11/023,371

(22) Filed: Dec. 29, 2004
(Under 37 CFR 1.47)

(65) Prior Publication Data

US 2005/0110461 A1    May 26, 2005

Related U.S. Application Data

(63) Continuation of application No. 09/917,776, filed on Jul. 31, 2001, now abandoned.

(60) Provisional application No. 60/251,474, filed on Dec. 6, 2000, provisional application No. 60/222,286, filed on Aug. 1, 2000.

(51) Int. Cl.
*G09B 25/00* (2006.01)
(52) U.S. Cl. ................. 434/365; 434/350; 320/107
(58) Field of Classification Search ........... 434/219, 434/224, 350, 365; 318/280; 600/300; 379/21; 206/224; 705/43; 455/517; 320/116, 107, 320/111; 340/5.92; 361/683, 820
See application file for complete search history.

(56) References Cited

U.S. PATENT DOCUMENTS

| | | | |
|---|---|---|---|
| 3,675,108 A | 7/1972 | Nicholl | |
| 3,696,283 A | 10/1972 | Ackley, III | |
| 4,143,417 A | 3/1979 | Wald et al. | |
| 4,160,941 A | 7/1979 | Bennett | |
| 4,237,409 A | 12/1980 | Sugalski | |
| 4,672,292 A | 6/1987 | Hernandez | |
| 4,998,055 A | 3/1991 | Nash et al. | |
| 5,039,929 A | 8/1991 | Veistroffer et al. | |
| 5,206,577 A | 4/1993 | Fish | |
| D336,631 S | 6/1993 | Ivester | |
| D337,986 S | 8/1993 | Brunner et al. | |
| 5,357,184 A | 10/1994 | McGowan et al. | |
| 5,394,074 A | 2/1995 | Ori | |
| 5,467,341 A | 11/1995 | Matsukane et al. | |
| 5,486,749 A | 1/1996 | Brainard | |
| 5,521,958 A | 5/1996 | Selig et al. | |
| 5,565,756 A | 10/1996 | Urbish et al. | |
| 5,583,912 A * | 12/1996 | Schillaci et al. | ............ 379/21 |
| 5,602,456 A | 2/1997 | Cargin, Jr. et al. | |
| 5,641,588 A | 6/1997 | Sieminski et al. | |
| 5,647,484 A | 7/1997 | Fleming | |
| 5,671,407 A | 9/1997 | Demers et al. | |
| 5,677,827 A | 10/1997 | Yoshioka et al. | |

(Continued)

*Primary Examiner*—Joe H. Cheng
(74) *Attorney, Agent, or Firm*—Banner & Witcoff, Ltd.

(57) ABSTRACT

A mobile teaching system is disclosed which allows the use of personal computing devices in a learning environment. A plurality of portable computers may communicate with a portable network center to undergo lesson plans, testing, and other educational tasks. The portable computers may be stored in a mobile storage unit that may also serve as a network communications center, and may also provide power connections for the computers. The computers may include removable, rechargeable batteries, which may be recharged at the storage unit.

27 Claims, 22 Drawing Sheets

U.S. PATENT DOCUMENTS

| | | |
|---|---|---|
| 5,687,717 A | 11/1997 | Halpern et al. |
| 5,694,019 A | 12/1997 | Uchida et al. |
| 5,703,929 A | 12/1997 | Schillaci et al. |
| 5,751,134 A | 5/1998 | Hoerner et al. |
| 5,764,726 A | 6/1998 | Selig et al. |
| 5,768,098 A | 6/1998 | Murayama |
| 5,831,415 A | 11/1998 | Rudolph et al. |
| 5,860,015 A | 1/1999 | Olson |
| 5,860,518 A * | 1/1999 | Axelrod ...................... 206/224 |
| 5,888,664 A | 3/1999 | Sieminski et al. |
| 5,889,386 A | 3/1999 | Koenck |
| 5,903,131 A | 5/1999 | Sekine et al. |
| 5,915,008 A | 6/1999 | Dulman |
| D412,702 S | 8/1999 | Goto |
| 5,957,699 A | 9/1999 | Peterson et al. |
| 5,982,141 A | 11/1999 | Hinohara |
| 5,999,401 A | 12/1999 | Howell et al. |
| 6,008,621 A | 12/1999 | Madison et al. |
| 6,023,147 A | 2/2000 | Cargin, Jr. et al. |
| 6,044,062 A | 3/2000 | Brownrigg et al. |
| 6,075,340 A | 6/2000 | Koenck |
| 6,078,164 A | 6/2000 | Park |
| 6,108,199 A | 8/2000 | Bonardi et al. |
| 6,218,796 B1 | 4/2001 | Kozlowski |
| 6,405,049 B1 * | 6/2002 | Herrod et al. .............. 455/517 |
| 6,421,525 B1 | 7/2002 | Prewitt |
| 6,493,217 B1 | 12/2002 | Jenkins, Jr. |
| 6,650,225 B1 | 11/2003 | Bastian et al. |
| 6,771,044 B1 * | 8/2004 | Vinciguerra et al. ........ 320/116 |
| 2001/0056402 A1 * | 12/2001 | Ahuja et al. .................. 705/43 |
| 2002/0097567 A1 | 7/2002 | Zodnik et al. |

\* cited by examiner

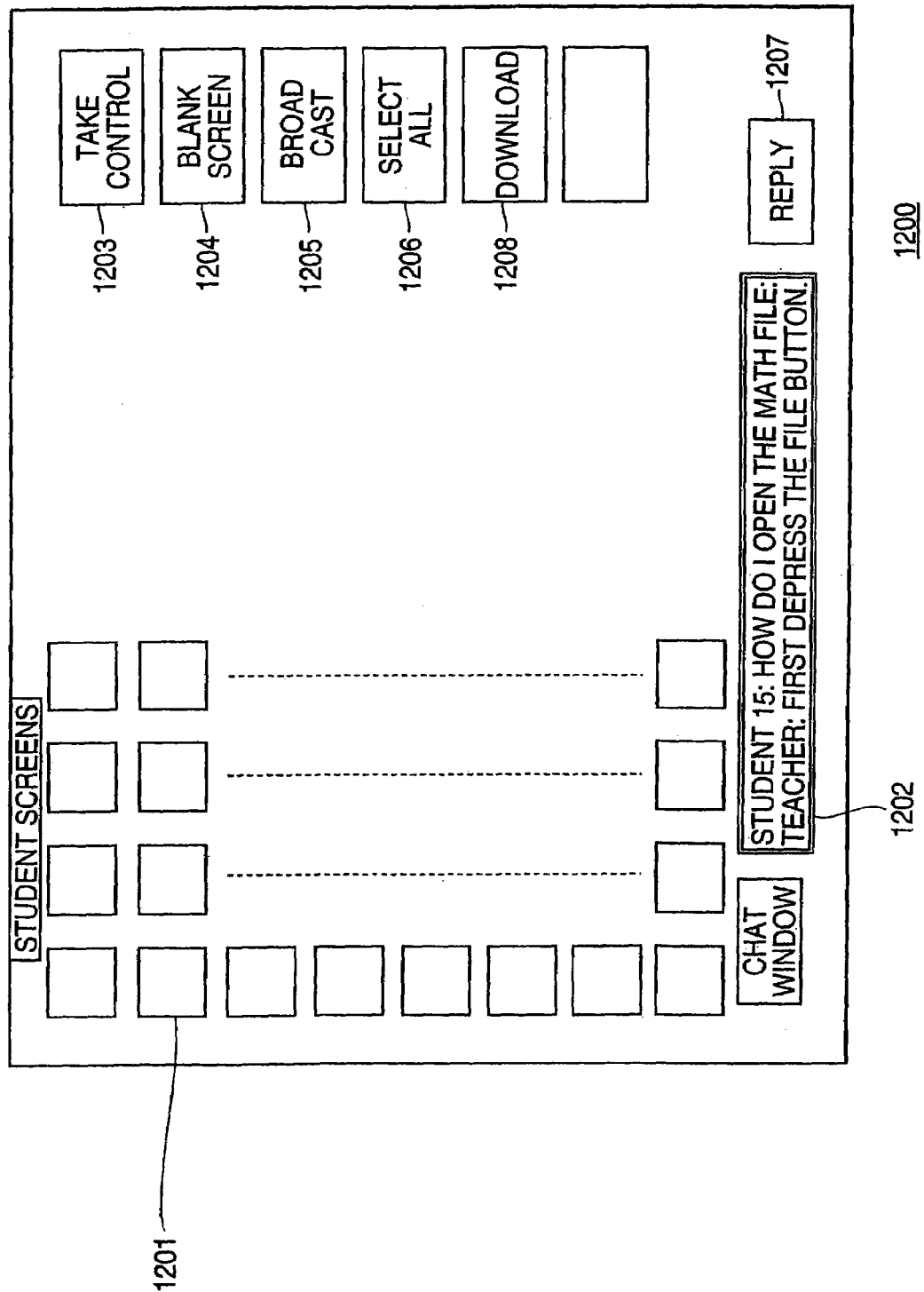

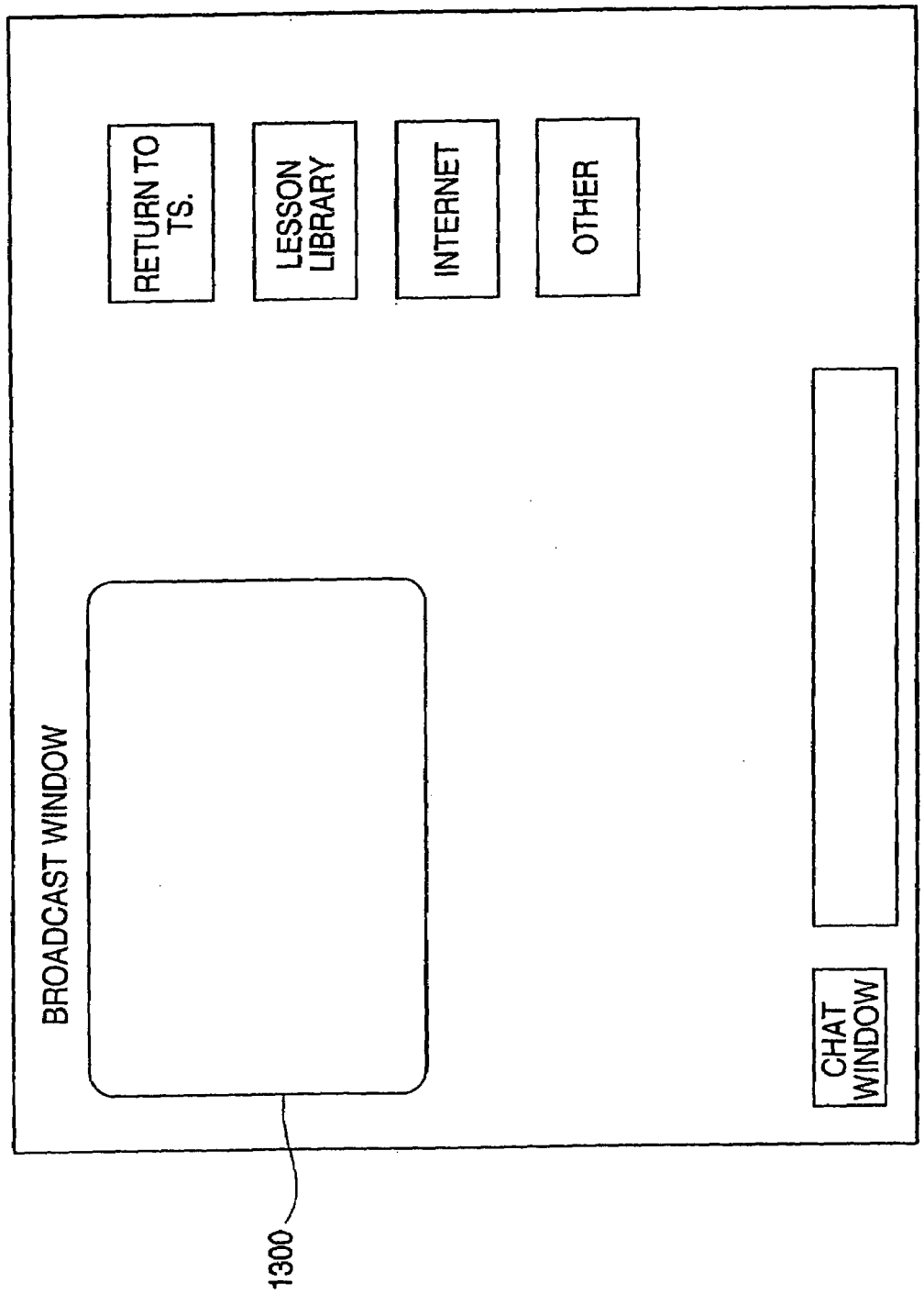

FIG. 14

MGMT

Earthwalk Quizshow Management

New Quiz — 1402

Quiz | Questions

Quiz List

| | Title |
|---|---|
| | State Capitols |
| | Company Training Marc |
| | Xbn0,0nbvbnbvfgdfvgd |

1401

Questions on Quiz

| Type | Question | Answer |
|---|---|---|
| 1 | What is the Capital of North Carolina? | Raleigh |
| 2 | What is the Capital of California? | C. Sacramento |
| 2 | What is the Capital of Florida? | B. Tallahassee |
| 1 | What is the Capital of Maryland? | Annapolis |
| 2 | Bismarck is the Capital of What State? | D. North Dakota |
| 1 | What is the Capital of Maine? | Augusta |
| 2 | What is the Capital of New Hampshire? | A. Concord |
| 2 | What is the Capital of Nevada? | D. None of the above |
| 2 | What is the Capital of Ohio? | A. Columbus |
| 2 | What is the Capital of Utah? | C. Salt Lake City |

Quizshow Response Form - Version: 20000307

Question
What is the Capital of California?

Select Answer
- ○ A. Los Angeles
- ○ B. Fresno
- ⊙ C. Sacramento
- ○ D. San Diego

[Prior Question] — 1701
[Next Question] — 1702

[Complete Quiz] — 1703

Question Worth: 1 — 1705
Question Timer: 4 — 1704

FIG. 18

Quiz Results - Version: 20000307

Quiz Summary Results

- Student Id: Bryans
- Points Earned: 9
- Quiz Id: 1
- Question In Quiz: 10
- Quiz Duration: 0:1:21
- Percent Grade: 90
- Quiz Time: 6/19/00 11:39:37 am
- Points Possible: 10

Question: What is the Capital of North Carolina?
- Correct Answer: Raleigh
- Your Answer: Raleigh
- Points Available: 1
- Points Scored: 1

Question: What is the Capital of California?
- Correct Answer: C. Sacramento
- Your Answer: C. Sacramento
- Points Available: 1
- Points Scored: 1

Question: What is the Capital of Florida?
- Correct Answer: B. Tallahassee
- Your Answer: B. Tallahassee
- Points Available: 1
- Points Scored: 1

Question: What is the Capital of Maryland?
- Correct Answer: Annapolis
- Your Answer: Annapolis
- Points Available: 1
- Points Scored: 1

1800

MOBILE TEACHING SYSTEM

CROSS-REFERENCE TO RELATED APPLICATIONS

The present application is a continuation of U.S. application Ser. No. 09/917,776, filed Jul. 31, 2001, now abandoned and claims priority to U.S. Provisional Application No. 60/222,286, filed Aug. 1, 2000, and entitled "Mobile Teaching System;" and to U.S. Provisional Application No. 60/251,474, filed Dec. 6, 2000, also entitled "Mobile Teaching System."

FIELD OF THE INVENTION

The present invention relates generally to the field educational computer networks. In particular, embodiments of the present invention relates to a mobile educational computer network in which computers are provided to teachers and students. More particularly, one aspect of the present invention relates to a mobile network center that may also store a number of computers for use with the network. In another aspect of the present invention, computerized lesson plans may be customized and supplied via the educational computer network to the teachers and/or students.

BACKGROUND OF THE INVENTION

The race is on among today's employers to identify, acquire, and benefit from the many advantages offered by electronic computers and computer systems. Grocery stores use computers to track and manage inventories; banks use computers for near-instantaneous transactions with businesses, other lenders, and their customers; manufacturing plants use computers to provide automated control over assembly lines; and countless others are using computers to simplify, streamline, and otherwise improve their lives and/or businesses. More and more of these uses will certainly be identified as computer technology improves.

It has become clear that today's children, or tomorrow's workforce, will absolutely have to possess at least some computer skills if they are to be successful. This is a growing concern of parents and educators alike, and there is already talk of a "digital divide" that will unfairly separate children into two classes: 1) those who were fortunate enough to learn computer skills in their primary or secondary education, and who are prepared for the emerging workforce; and 2) those who were not so fortunate, and who will face an uphill battle in the workforce. The divide is usually not the fault of the children, the parents, or the educators, and as such, is unfair. Instead, the reason for the divide usually stems from the costs associated with providing computers for children to study.

Primary and secondary schools (e.g., K-12) typically face tight budget restrictions, and computers are not cheap. Furthermore, many schools cannot afford the additional costs involved in setting up a computer laboratory or network, such as routing additional wiring through the building, or installing power and environmental control equipment.

Cost, however, is not the only factor limiting the number of computers currently in our schools. Another problem is the limited availability of teaching materials that may be used with such computers. Without an extensive supply of lessons and teaching materials for the computers, it is difficult for an educator to justify the cost of acquiring them. There is a need for computer-based lesson plans for students, and teaching materials that allows teachers to effectively monitor, control, and guide the students through their computer lesson plans.

There are also additional problems faced by an educator or teacher who is considering implementing computers in the classroom. One such problem is theft and/or vandalism. For those schools that have undertaken the high cost of implementing a computer system or laboratory, there is a need for measures that can protect the school's equipment from being stolen or vandalized. Another problem is the space available in the classroom. The typical computer (desktop and laptop) is large enough to occupy most of the workspace (e.g., a student's desk) that is available to the student, making the individual computer less desirable. There is a need for an educational computer system that will allow one or more students to have individual computers to work with, but which will also minimize the space occupied by such computers.

Another problem is expandability. A school's enrollment typically varies from year to year, which makes expandability a serious concern for any school wishing to install a computer network or system. There is a need for an educator's computer network to be expandable. This desired expandability is not limited to hardware. An educator's lesson plan may also need to be both up-to-date with current events, and flexible to accommodate various teaching styles.

Another problem arises due to the fact that typical computers, such as laptop computers, must be deactivated in order to change power sources and/or exchange batteries. Such a deactivation would be disruptive to an educator's lesson plan, particularly if a number of students need to undergo such a process at different times throughout a lesson. Accordingly, there is a need for a teaching system that satisfies the needs identified above, but may also minimize the disruption to the lesson plans caused by changing power sources of computers.

These concerns, along with numerous others, may be alleviated using one or more embodiments of the present invention.

BRIEF SUMMARY OF THE INVENTION

The present invention addresses various computer system needs, and is characterized by several embodiments that will be summarized below.

In one embodiment of the present invention, a mobile teaching system is provided. In an exemplary embodiment, a portable cart may carry one or more hardware devices that may be used to communicate with, or network, one or more computers. In a further embodiment, the cart may include a network server. In another further embodiment, the cart may include wireless communications devices to communicate with one or more computers. In another further embodiment, the cart may support roaming by one or more computers between the cart and other devices, such as a fixed network or another cart.

In a further embodiment, the cart may be communicatively connectable to a communications network beyond the portable computer network. As an example, the cart may be connected to a local area network (LAN) of a premises, such as a school, and may also be connected to a communication network beyond the premises (such as the Internet). In another further embodiment, the cart may be connected to a fiber, cable, and/or telephone connection to directly access a communication network outside of the premises.

In a further embodiment, the cart may provide for the storage of one or more portable computers that may be used with the cart. The cart may include, in another further embodiment, protective surfaces to prevent damage to devices used on or stored in the cart. Additionally, another further embodiment of the cart may include a locking mechanism to minimize theft.

In a further embodiment, the cart may include hardware for providing power to one or more computers that may be used with the cart. In one further embodiment, the cart may include a power supply for this purpose. In another further embodiment, the cart may include one or more battery recharging connections to allow one or more batteries (such as batteries within a portable computer) to be recharged. In a further embodiment, the cart may include a current-limiting device to monitor and control the recharging of a variable number of batteries, helping to prevent high current draw when recharging a number of batteries. Another further embodiment may include one or more spare batteries.

In some exemplary embodiments, the portable cart may include one or more wheels to allow for greater mobility.

In another embodiment, the teaching system may offer a compact unit that stores computers. Such a modular unit may provide a more space-efficient storage unit. The portable cart may also include a drawer containing a local server, one or more shelves storing one or more computers, a number of dividers, and/or antenna for wireless communications. In a further embodiment, the cart may be implemented as a portable carrying case.

The mobile systems may use a portable computer functionally similar to a standard laptop computer, generally serving as a portable workstation, and operating as computer. The portable computer may include one or more processors, memories, and input/output devices such as screens, keyboards, mouse, stylus, and other devices found in portable computing devices. One embodiment of the portable computer is also equipped with a rechargeable battery across the front. This location of the battery may help reduce the size of the laptop, prevent battery heat from rising through other equipment inside the laptop, and make removal and replacement of the battery more convenient for users of all ages. In one embodiment, the battery may be easily removed by sliding out two opposed, spring-loaded, release switches.

In a further embodiment, the portable computer may be equipped with a built-in wireless interface to communicate with one or more Local Servers and/or modular units, and may also have a built-in antenna for RF communication. In a further embodiment, the portable computer may be smaller and lighter than most laptop computers for convenient storage and use by younger students. In a further embodiment, the portable computer may be equipped with an alternate source of power to allow continued operation should a primary power source (e.g., battery) become depleted.

Another embodiment of this system allows one computer user to interact with, monitor, and even control the operation of other computers. In one embodiment, a computer may be used by a teacher or instructor, while other computers may be used by students. In a further embodiment, the teacher may use a computer to conduct a computer lesson, and the students may follow along on their own computers. The teacher may also use a centralized point of attention, such as a monitor on the Portable Computer Center, for some or all of a particular lesson.

In a further embodiment, the teaching of a lesson may be enhanced significantly through the use of an Instructing Software Program that operates on the teacher's computer. In one embodiment, the Instructing Software Program may be configured to enable a user to manage, interact with, and monitor other users linked to a common network.

In a further embodiment of this software a teacher could interact with student users through a graphical interface on the teacher's workstation. The screen may enable simultaneous viewing of user activity on all computers being used. Such monitoring may be helpful to ensure that students are keeping up with a particular lesson, or that they are not misbehaving.

In a further embodiment, the teacher's computer may be equipped with a touch-sensitive display screen where the teacher may select one or more of the students' computers simply by touching the corresponding thumbnail. The teacher's display screen may also include a Chat Window to enable a teacher to communicate with one or many of the students in the class. Additional features may also be provided to the teacher through the instructor's screen. For example, a "Take Control" button, when selected, may allow the teacher to assume control over one or more selected computers. A "Blank Screen" button may allow the teacher to erase or clear the screen and/or work of any student at any given time during classroom activity or instruction. A teacher may also be provided with a "Broadcast" graphical button, enabling the teacher to broadcast one or more selected screen(s) to a central monitor, and/or to the screens of other computers. Another feature that may be provided is a "Select All" graphical button that would automatically highlight and select all student computers for desired operation.

Embodiments of the present invention may be further enhanced through the use of testing software. In one embodiment, the testing software may be configured to enable a user, software product, or online product to quiz and test other users on a network workstation, along with grading and analyzing their work. In one embodiment, a teacher may first use the testing software to generate a quiz comprising of a series of questions. For security purposes, this portion of the testing software may first require the entry of a teacher password before displaying any of the quizzes or questions. A teacher may use the testing software to create a question, or set of questions, for a quiz. The teacher may also prepare an answer for the question.

The computer lessons and/or quizzes may be obtained from other sources as well. For example, a teacher could load the lesson or quiz onto the teacher's computer and/or Local Server from a separate disk, such as a magnetic or optical disk. Lessons, quizzes, and/or other programs may be retrieved via the external network as well. Once the quiz has been distributed to the students, the testing software may execute a program on the students' computers to administer the quiz.

The software may display a question and provide a space for a student to provide an answer.

In a further embodiment, the testing software may grade the student's answers and provide results to the student and teacher for review in a review window. In this particular embodiment, the software may track student quizzes, report this progress to a teacher, and even send a final report at the end of such designated grading period. The software may keep track of quiz-taking statistics. A software lesson or quiz provider may use artificial intelligence and/or adaptive programming technology to test each student with respect to their particular strengths and weaknesses.

In summary, the present invention offers numerous embodiments and aspects such as the ones summarized above, and the ones described below. It will also be understood by one of ordinary skill in the art that the present invention includes embodiments, combinations of embodiments, and subcombinations of embodiments summarized above and/or described below.

BRIEF DESCRIPTION OF THE DRAWINGS

FIG. 12 is an instructor software screen according to one embodiment of the present invention.

FIG. 13 is a screen showing an aspect of an embodiment of the present invention.

FIG. 14 shows a graphical window of a testing program according to one embodiment of the present invention.

FIG. 17 shows another a graphical window of a testing program provided to a student according to one embodiment of the present invention.

FIG. 18 is a graphical window of a testing program showing test results according to one embodiment of the present invention.

DETAILED DESCRIPTION OF THE INVENTION

Aspects of the present invention will be beneficial to many computer users, including those in the classroom environment, and may include a portable computer laboratory complete with student and instructor stations, communications server, secure computer storage, battery recharging, spare batteries, and many more features that will be described below.

The Portable Computer Center

Figure 1:
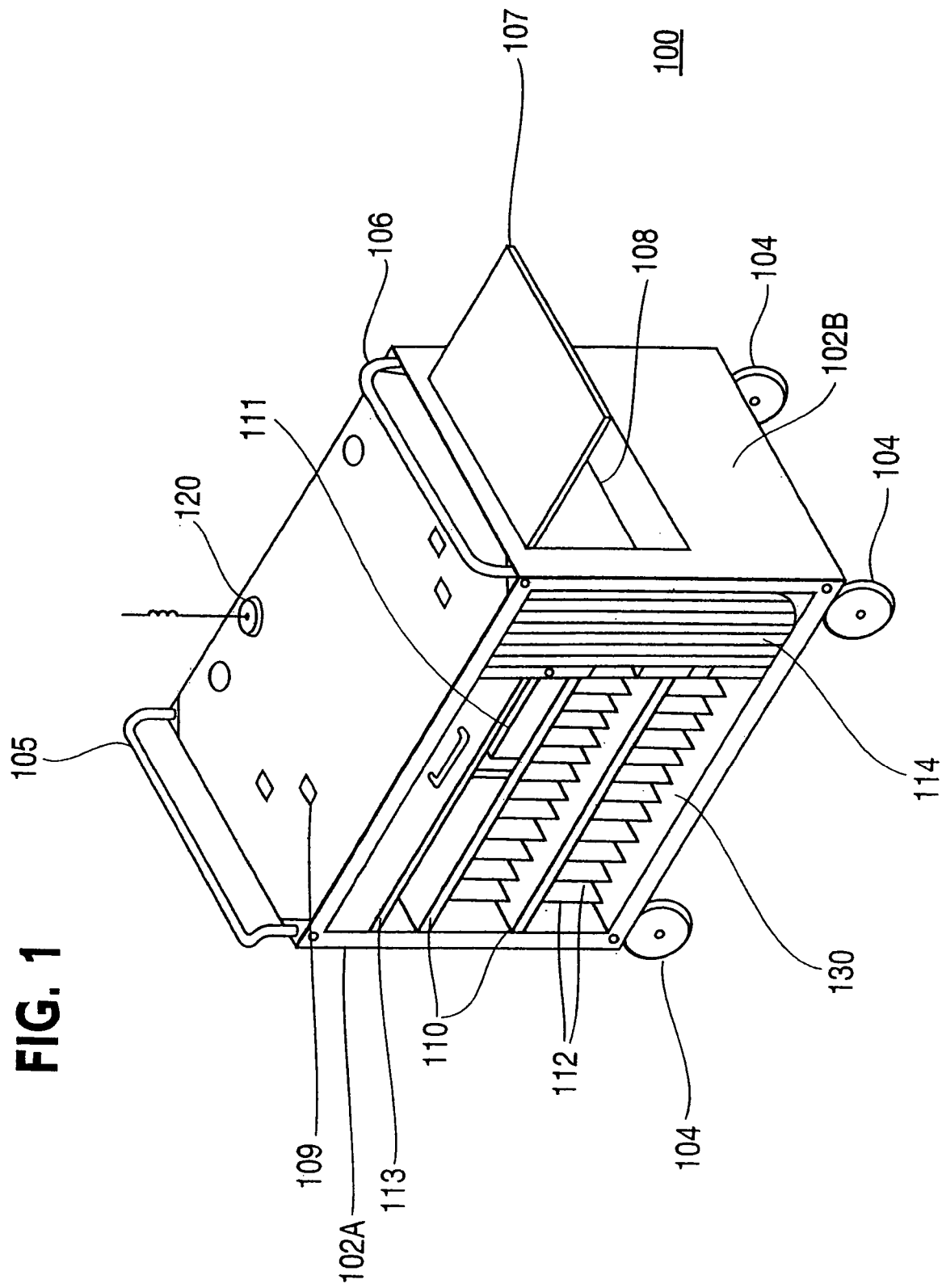
FIG. 1 shows a frontal isometric view of an example embodiment of the present invention.

As shown in FIG. 1, an example embodiment of the present invention is the Portable Computer Center 100. In one embodiment, the Portable Computer Center 100 may be a portable cart constructed using a bottom panel 101, side panels 102a, 102b, top panel 103, and back panel 302 (see FIG. 3). These panels may be distinct sheets of material that are assembled using, for example, bolts, screws, adhesives, and/or welding, and may be constructed of any sturdy material (e.g., steel, plastic, wood, etc.). The panels need not all be made of the same material. In alternative embodiments, two or more of the panels may be pre-fabricated together, eliminating the need for assembling the panels together.

In one embodiment, the Portable Computer Center 100 may be supported by a number of wheels 104. The FIG. 1 embodiment includes four wheels 104 (one is hidden by the view), which helps make the Portable Computer Center 100 more mobile. In some embodiments, two or more of the wheels may be rotating caster-type wheels, to allow for greater steering in mobility. In the depicted embodiment, all four are rotating caster-type wheels. However, alternative embodiments may differ. For example, one alternative embodiment may have fewer (or greater) than four wheels. Additional alternative embodiments may include a locking mechanism (not shown) on one or more wheels 104 to prevent unintended movement once the Portable Computer Center 100 has been moved to a desired location. Such locking mechanisms may be, for example, a simple wedge, brake, or clamp.

The Portable Computer Center 100 may also include handlebars 105, 106 to improve the ease with which the cart may be steered, pushed, or otherwise moved. The handlebars 105, 106 may also serve the additional purpose of securing any equipment located on top of the top panel 103 of the Portable Computer Center 100 from slipping. In a further embodiment, the top surface of panel 103 may also be coated with a non-slip surface, such as rubber, to minimize slippage.

Again referring to FIG. 1, the Portable Computer Center 100 may also include one or more external shelves 107. In one embodiment, a single external shelf 107 is located on a side panel 102b of Portable Computer Center 100, and provides a working space for an instructor. In this embodiment, the instructor may operate a personal workstation placed on the shelf while viewing a monitor that may be placed on the cart. The instructor may also have the ability to see the monitor without blocking the view of any students in the room while still remaining close enough to the monitor to point to it and teach from it. The external shelf 107 may be supported by two arms 108 (one is hidden by view in FIG. 1), which are hinged to allow external shelf 107 to fold down against side panel 102b when not in use. In one embodiment, the external shelf 107 may fold to be flush with the surface of side panel 102b, minimizing the size of the Portable Computer Center 100. In other embodiments, the shelf may be removed, or slid into the cart for convenience with storage.

In a further embodiment, external shelf 107 may be used as a charging and/or "hot swap" battery changing station. For example, should a student's laptop become low on battery power, that student might be permitted to bring his/her laptop to the cart, and attach the laptop to a power supply line on the cart, to allow for continued use of the computer while changing batteries. The changing station may also be used as a charging station, to allow charging of the battery in a student's computer while in use. This may be advantageous, for example, should there be an insufficient number of charged batteries. In such a scenario, line may be a longer cord. Multiple versions of line may also be provided.

In alternate embodiment, the charging station might simply use an upper surface of the cart to support the charging laptop. Such an alternate embodiment would reduce the need for external shelf 107 and/or longer line. In further embodiments, power supply line may be powered with a dedicated external power supply, which may be different from other power supply (or supplies) within the cart. Such an embodiment may be advantageous, for example, to allow the computer at the recharging station to recharge more quickly.

In one embodiment, the top panel 103 may include one or more loops 109 which may be used to lock down equipment placed on top of Portable Computer Center 100. For example, higher-strength cables may be routed through the loops 109 and the equipment, and locked using a conventional padlock. Alternatively, the equipment may include hooks or latches that lock onto loops 109 when the equipment is placed atop Portable Computer Center 100.

The width of the Portable Computer Center 100 may be designed narrowly enough to accommodate the various room sizes for which the Portable Computer Center 100 may be used, and yet wide enough to store any desired equipment inside the Portable Computer Center 100 and support equipments used on top of the Portable Computer Center 100. In one example embodiment, the width of the Portable Computer Center 100, or width of side panel 102a, b, measures thirty-four inches. This width, however, may be decreased or increased depending on the particular intended use.

In one embodiment, one or more interior shelves 110 may be used to store equipment and/or devices within the Portable Computer Center 100. In the FIG. 1 embodiment, bottom panel 101 may also serve as an interior shelf. However, in alternative embodiments, bottom panel 101 need not provide actual support for any equipment, and may instead be replaced with another interior shelf 110.

As shown in FIG. 1, interior shelf 110 may be used to store and/or support a local server 111 (LS). Local Server 111 may be a computer network server and/or other processing device that facilitates communication with and/or among one or more computers, and allows the Portable Computer Center 100 to act as a mobile computer network server. This network may use any known method, such as Ethernet or Local Access Network technologies, and may use wired and/or wireless communications. For example, Local Server may include radio frequency (RF) transmission/reception capabilities that allow it to communicate wirelessly with other devices. Frequency sharing, multiplexing, and other forms of sharing transmission capabilities may be implemented to allow the Local Server 111 to communicate with as many devices and/or laptops as needed. Although Local Server 111 is shown to be within the Portable Computer Center 100, it may alternatively be located external to, or atop, the Portable Computer Center 100. Such an alternate configuration would conserve space within the unit.

In one embodiment, the Local Server 111 uses antenna 120 for wireless communications with one or more computers and/or external networks. Preferably, antenna 120 is movable, and may be placed in various locations to improve reception. In alternative embodiments, there may be different means for wireless communications involving the Local Server 111. For example, the Local Server 111 may be configured to send and/or receive infrared (IR) signals. In such embodiments, antenna 120 may be replaced with or accompanied by an IR receiver and/or transmitter for this purpose. Additional workings of the Local Server 111 will be described further below.

In one example embodiment, the Portable Computer Center 100 provides for the storage of one or more portable computers that may communicate with Local Server 111. These computers may be stored on shelves 110 within Portable Computer Center 100, and may also be separated from one another by dividers 112. As discussed above with respect to top panel 103, shelves 110 and/or dividers 112 may be coated with non-slip material to minimize damage to the Portable Computer Center 100 and/or devices stored within. Portable Computer Center 100 may also include one or more drawers 113 to store additional equipment and/or devices.

The front of the Portable Computer Center 100 may be covered with a door 114. One advantage to having door 114 would be to prevent contents of the Portable Computer Center 100 from spilling out as the Portable Computer Center 100 is moved. Referring to FIG. 1, one example embodiment of the cart would use a roll-top door 114. A roll-top door 114 minimizes the amount of space needed external to the Portable Computer Center 100 to access its contents and may be safer than doors which may injure children with sharp edges or swing out and cause the cart to tip over. Alternative embodiments, however, may include door 114 as an accordion-type door, or any other type of enclosure device. Such alternate doors may be simpler in design and/or cost.

Alternatively, door 114 may be omitted. In some embodiments, the door 114 may be replaced by a fabric curtain, webbing or netting, one or more security lines, or any other equivalent means with which the contents of Portable Computer Center 100 may be securely contained within Portable Computer Center 100.

Figure 2:
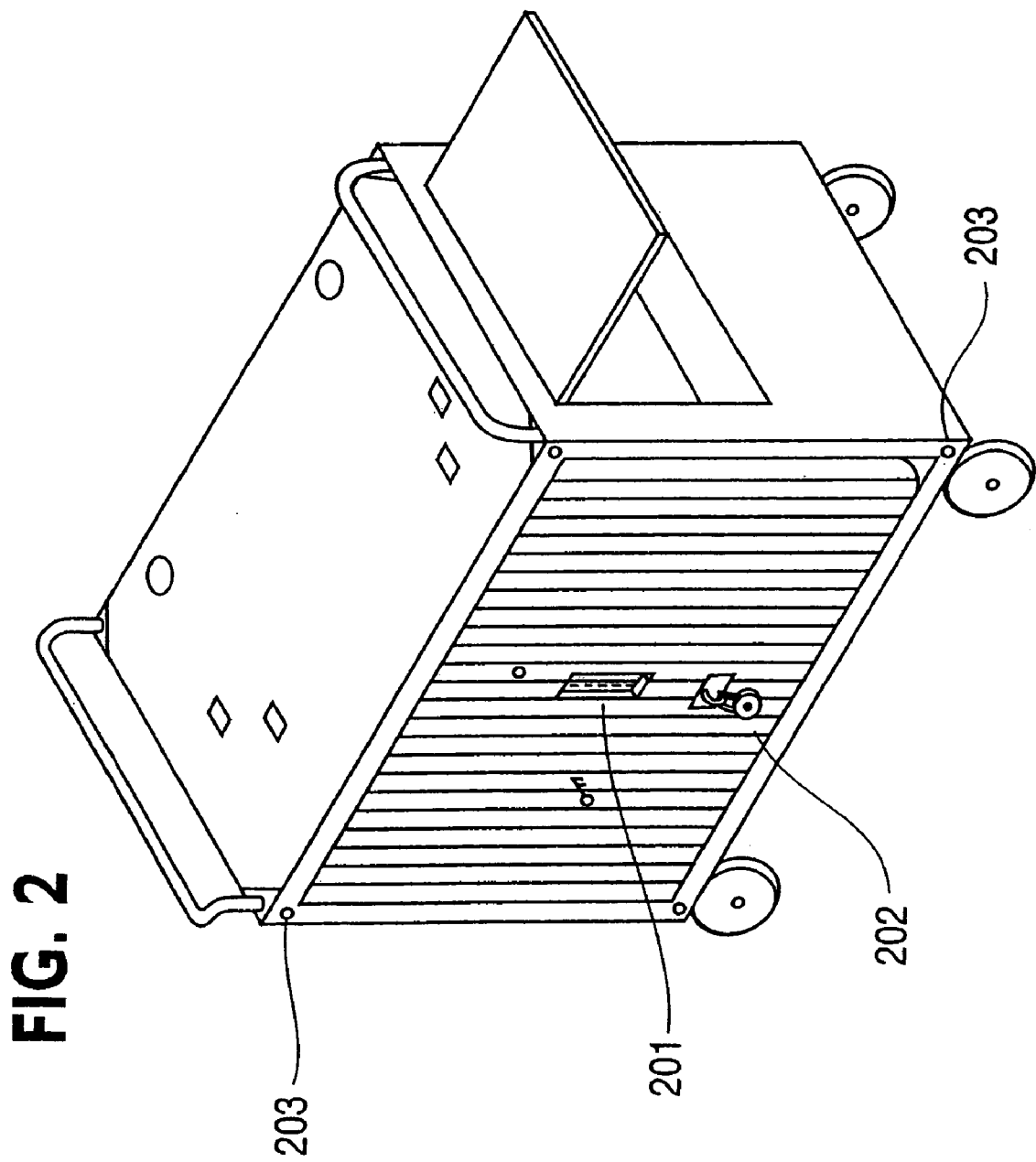
FIG. 2 shows a frontal isometric view of an example embodiment of the present invention with a closed rolling door.

In the depicted embodiment, two roll-top doors 114 come together near the center of the front of the Portable Computer Center 100 when closed. FIG. 2 shows the FIG. 1 Portable Computer Center 100 with its doors 114 closed. In one embodiment, the doors 114 include a clasping mechanism 201 to keep them from unintentionally opening. Clasping mechanism 201 may be of any type, such as the hook-and-eye variety, and may also include a higher security locking mechanism that requires a key or combination to open. Alternatively, the doors 114 may also include a separate latch and hook 202 to lock the doors 114 using a conventional key or combination padlock.

To further prevent unwanted tampering or theft, the panels 101, 102a, 102b, and 103 may be secured using bolts 203 to deter or prevent removal of an entire side or panel of the Portable Computer Center 100. In one embodiment, the bolts 203 could be simple screws removable by any conventional screwdriver. In another embodiment, the bolts 203 could be 'security bolts' wherein the bolts 203 could only be removed by some unconventional tool, such as a star- or hexagonal-shaped screwdriver.

Figure 3:
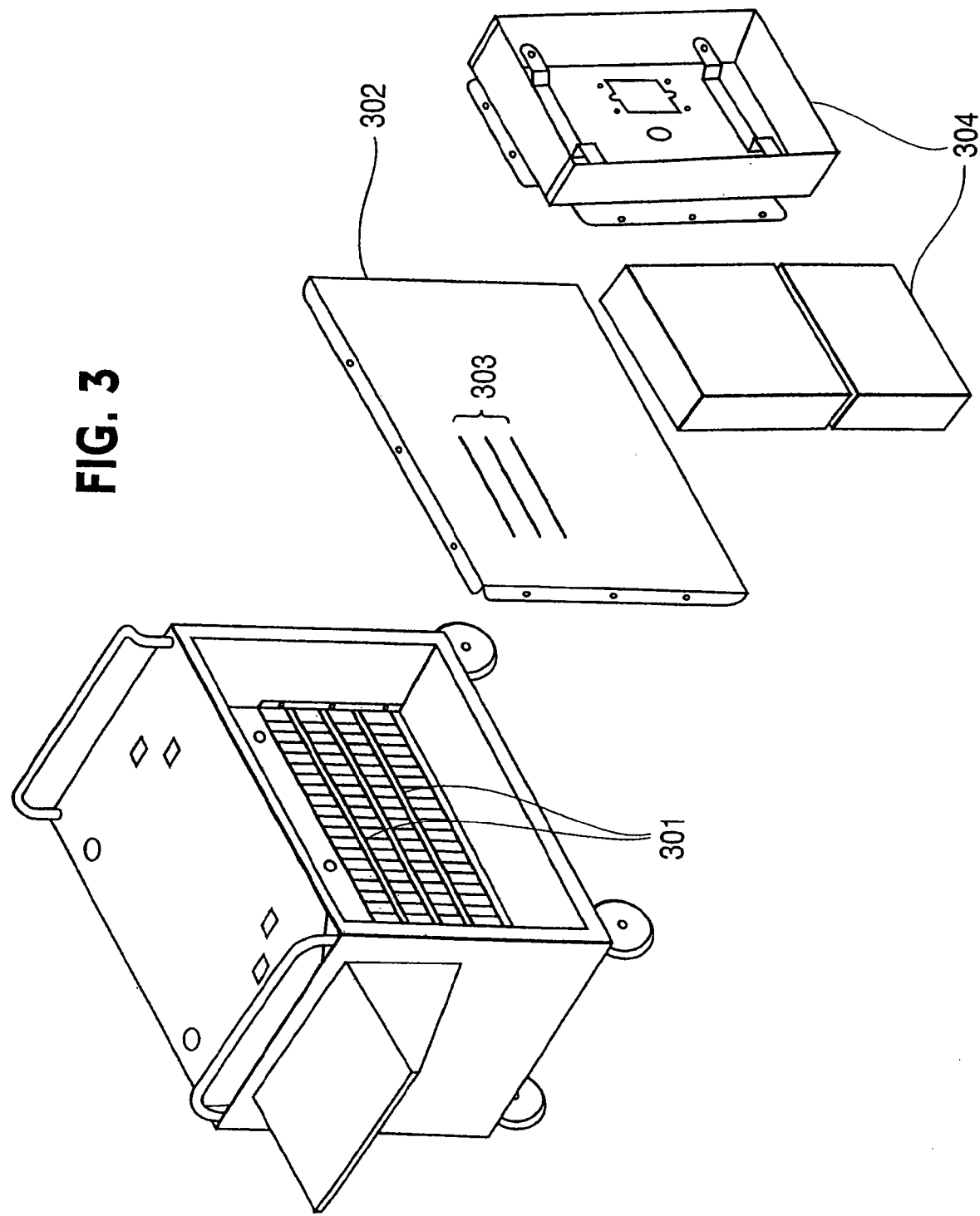
FIG. 3 shows a rear isometric view of an example embodiment of the present invention.

The back of the Portable Computer Center 100 may also be equipped with security measures to prevent theft from the back side. Referring to FIG. 3, one embodiment of such a security measure would be one or more security bars 320 which could be secured across the back of shelves 110 such that equipment could not be pulled through the back. Other embodiments could use multiple bars, place a wall or sheet across the back of the laptop, or possibly use electrical devices to prevent or indicate such theft or damage. The Portable Computer Center 100 may also be provided with a back panel 302 to further prevent theft of the equipment stored inside the Portable Computer Center 100. An embodiment of the back panel 302 may be secured by the bolts 233 described above.

The back of the Portable Computer Center 100 may also include one or more equipment panels 304, which may be used to store equipment and/or cabling that may be needed. There may also be access openings cut into the equipment panels 304 and the back Portable Computer Center panel 302 to allow external connections Local Server 111 located within the Portable Computer Center 100.

The Portable Computer Center 100 may be equipped with a cooling system to dissipate the heat produced by the equipment within. In one particular embodiment, the back panel 302 may include one or more vents 303, or cooling baffles and/or any associated fans. One or more embodiments may also include similar vents, baffles, or fans on the top panel 103.

In one embodiment, the Portable Computer Center 100 may store a number of portable computers on shelves 110 when the computers are not in use. Some or all of these portable computers might use internal batteries as a power source for operation, and the Portable Computer Center 100 may recharge these batteries while the computers are stored.

Figure 4:
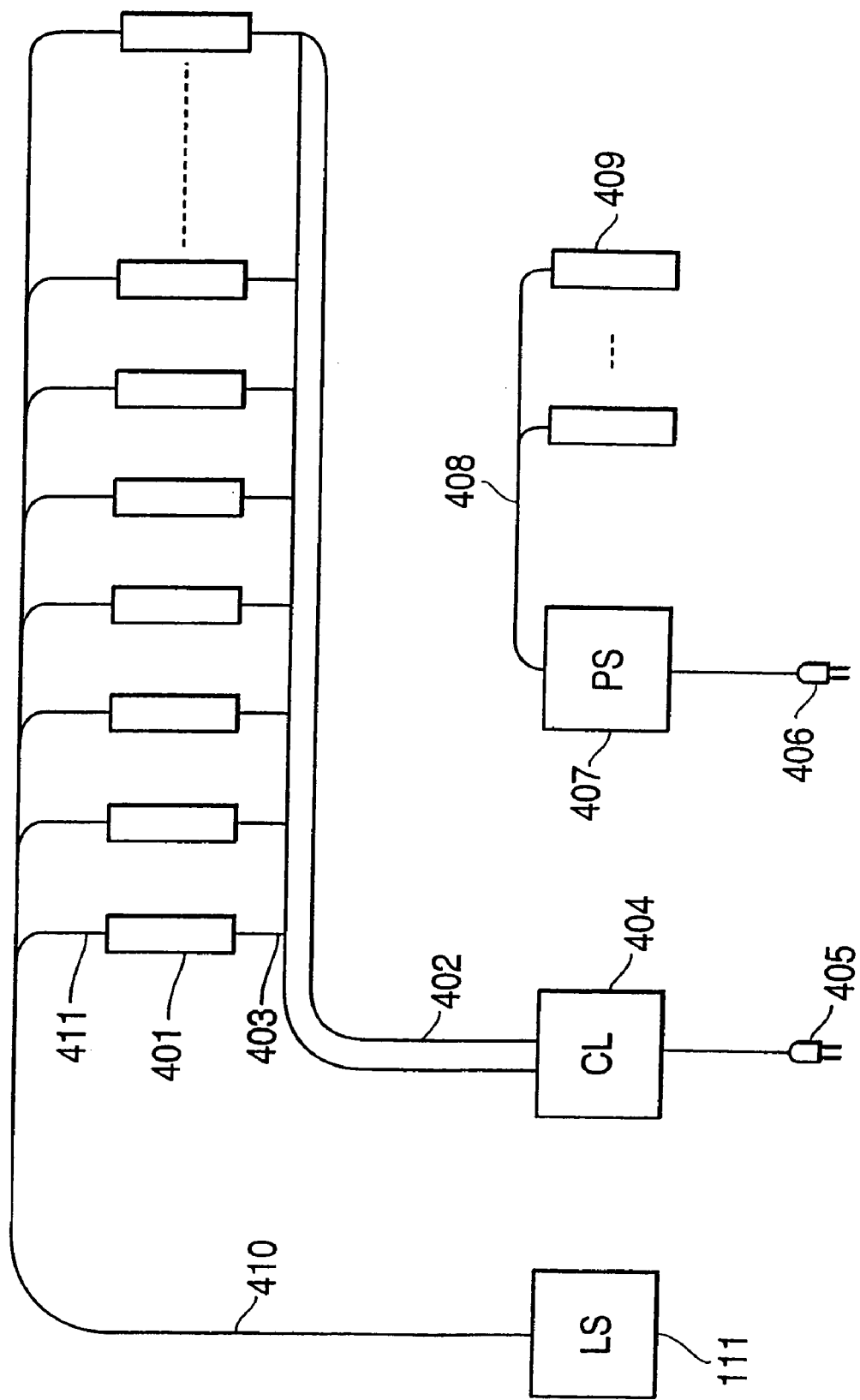
FIG. 4 shows power supply configurations according to an embodiment of the present invention.

FIG. 4 shows the basic electrical configuration for a Portable Computer Center 100 battery-charging embodiment. In FIG. 4, a number of portable computers 401 are shown, and an example embodiment of the Portable Computer Center 100 can store and/or recharge up to thirty-two (32) computers 401 at one time. The Portable Computer Center 100 may, however, be initially configured to operate with a fewer number of computers 401, and is also expandable to accommodate additional computers 401 as needed.

These computers 401 may be placed on shelves 110 in Portable Computer Center 100, and subsequently connected to a power bus 402 via a number of power bus connectors 403 compatible with the computers. Power bus connectors 403 may be of any type compatible with the computers 401, and may be a soft, flexible cord. Alternatively, connectors 403 may be rigid, which may advantageously help hold the computers in a fixed position during transport. The power bus 402 may connect one or more of the computers 401 to a power supply 404, which may be a current-limiting power supply to limit the amount of electrical current drawn by computers 401. The current-limiting power supply 404 is then connected to a power cord 405 that may be inserted into an electrical source, such as a standard 120 volt AC outlet.

The current-limiting power supply 404 is advantageous because the number of computers 401 charging at any one time may vary. For example, it may be possible to have only a single computer 401 charging, and it may be possible to have over thirty (30) computers 401 charging at once. Since the variation in the number of charging computers 401 might result in a variation of the total current drawn, current-limiting power supply 404 may be implemented to prevent problems associated with drawing an excessive amount of current. In an example embodiment, current-limiting power supply 404 may be selected to limit the total current to fifteen (15) Amps, because many school buildings have been designed with 15 Amp circuit-breakers. However, other current limitations may be selected just as well, depending on the system in which the PC 100 is to be used, and if no current limitations exist, then no current limitations are needed for power supply 404. Additionally, while FIG. 4 shows the current-limiting power supply 404 as a single entity, it is also possible to implement these functions using a plurality of current-limiters and/or power supplies. In some embodiments, the system 100 may include one or more uninterruptible power supplies (UPS), to allow recharging and/or communications to continue in the event of a power failure at the school.

FIG. 4 also shows a further embodiment, in which one or more portable computers 409 may operate from a power source other than a battery. Such a configuration may be desirable when, for example, one or more computers 409 have had their batteries drained, and no replacement battery has been charged. In this embodiment, the computers 409 may be connected to a power supply 407 via one or more power supply lines 408, which may then be connected to a power cord 406. The power cord 406 may then be connected to an electrical power source, such as a standard 120 volt electrical outlet. Variations of the FIG. 4 may also be implemented. For example, the power supply 407 is shown with a single box in FIG. 4, but alternate embodiments may employ a plurality of power supplies 407 to support a plurality of computers 409 at once. Furthermore, the power supply (supplies) 407 may also incorporate current-limiting functionality. Power supply 407 may be the same as power supply 404, and in some embodiments, power supplies 407 and 404 may be implemented with the same device.

Storing computers within the Portable Computer Center 100 may also offer additional advantages besides the recharging of batteries. For example, the various computers may also communicate with Local Server 111 during storage to download and/or upload information. For example, and as shown in FIG. 4, the Local Server 111 may be connected to an internal data bus 410. The data bus 410 may then be connected to a number of data connections 411 which, in turn, may be connected to the individual computers upon storage. In an example embodiment, these data connections 411 insert into a parallel communications port in the back of each computer. Alternatively, the connections 411 may connect to a serial communications port or some other data port on the computer. Some alternative embodiments may even have the computers inserted directly onto rigid data connectors 411 and power connectors 403 for storage.

Portable Computer Center 100 may include an area, such as drawer 113, that serves as a battery bay for storing and recharging spare batteries for one or more portable computers 401. These batteries may be stored in a drawer, on a shelf, in a separate compartment, or in any other convenient manner of storage. FIG. 5a shows a drawer 113 that is configured as a battery charging bay 500 (Bay). In the depicted embodiment, a current-limiting power supply 501 is located at the rear of the Bay 500. The power supply 501 may be connected to a power cord 502 that, in turn, may be connected to an electrical power source (such as a conventional 120 volt electrical outlet). As with the power supply shown in FIG. 4, current-limiting power supply 501 may be implemented as a single device, or may be implemented as a plurality of separate devices. In some embodiments, power supply 501 may be the same as power supply 404 and/or 407, and may be implemented with the same device as one or both of these supplies. Power supply 501 may then be connected to a power bus 503, which may then include a plurality of power connectors 504. The power connectors 504 may be of any suitable type that can connect with portable computer batteries 505 for recharging, and may be the same as connectors 403 discussed above. In this manner, the Bay 500 may be used to ensure that spare batteries 505 are available or charging. In one embodiment, the number of batteries being charged will be equal to the number of computers being stored in the Portable Computer Center 100. As one advantage, this embodiment enables an instructor to effectively double the battery time, and computer teaching time, that may be spent on the computers. In one embodiment, the power supply may be a power supply (e.g., 150, 200, 300, 600 Watt etc.) with current limiting circuitry. In further embodiments, one or more resettable fuses may be used to provide further protection. For example, a resettable fuse may be provided for each laptop that may be stored and recharged in the unit.

Figure 5:
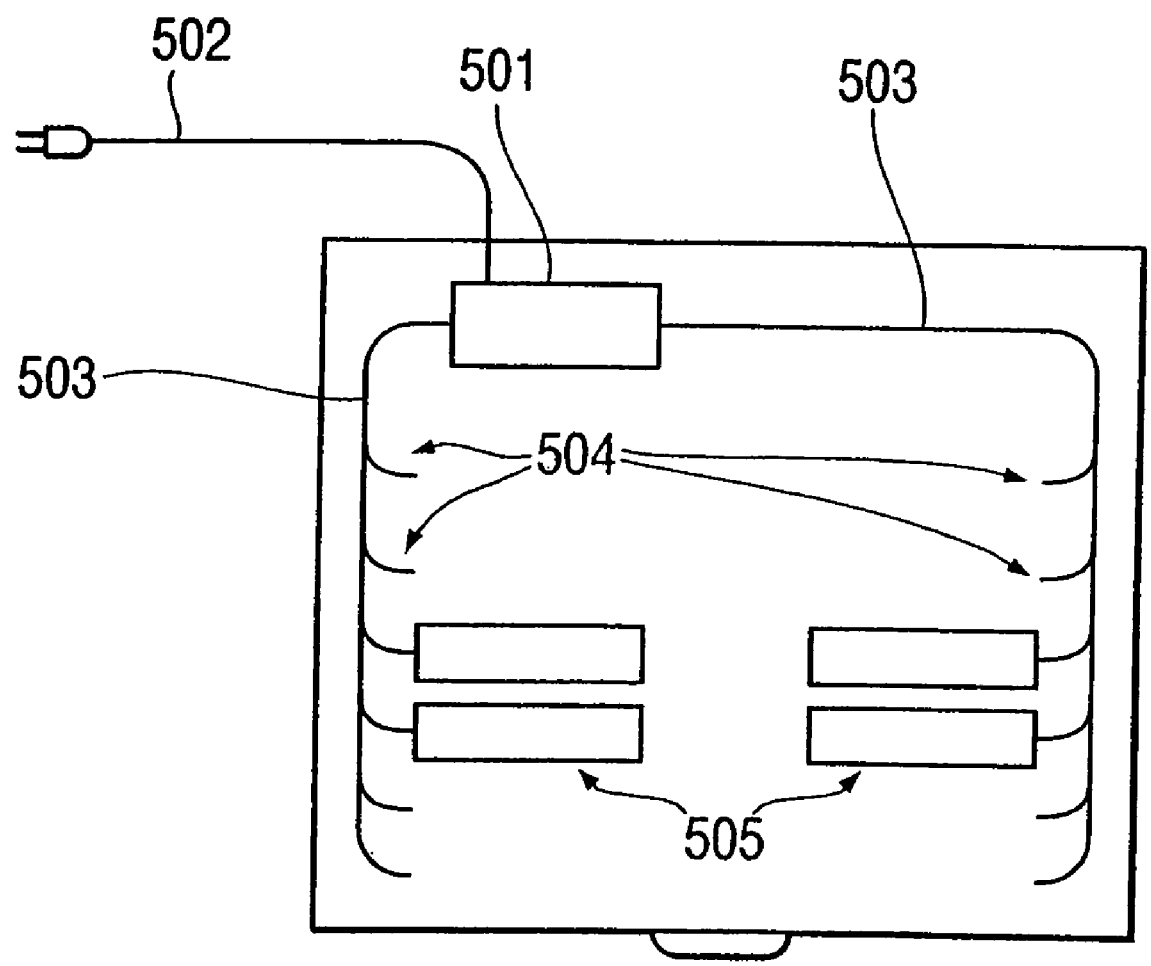
FIG. 5a shows a top view of an open drawer containing battery recharging equipment according to a further embodiment of the present invention.
FIG. 5b shows an alternate embodiment of the battery charging bay shown in FIG. 5.

Furthermore, in the FIG. 5 embodiment, the power supply (supplies) 501 in the Bay may be located to the rear of the drawer, while spare batteries 505 are located to the front. This configuration advantageously allows easier access to the batteries, while also balancing the Bay 500 and/or the PC 100, since the power supply 501 may be heavy, and one or more of the batteries 505 may be removed at various times. However, the power supplies need not be to the rear, and other configurations are also possible.

Since the Bay 500 may be in operation most of the time, the Bay 500 may be the greatest source of heat in the Portable Computer Center 100. Accordingly, in some embodiments, measures may be taken to ensure that the heat generated from the Bay 500 is dissipated as safely as possible, so as not to damage other equipment that may also be stored in the Portable Computer Center 100 (such as computers).

The drawer containing Bay 500 may be configured to have one or more cooling vents 603 to help dissipate the heat generated within the Bay 500. Additionally, the Bay 500 may be placed in a drawer location near the top of the Portable Computer Center 100 to avoid sending the heat generated from recharging through the equipment stored within. Placing the Bay 500 near the top of the Portable Computer Center 100 also simplifies access to the batteries 505 stored within. Alternatively, the Bay 500 could be placed near the bottom of the Portable Computer Center 100, allowing easier access to the non-battery equipment (e.g., computers), and lowering the center of gravity of the overall Portable Computer Center 100. Heat dissipation through the stored equipment may be avoided by, for example, placing cooling vents on the sides of the Bay 500, insulating the shelves 110, placing cooling fans within the Bay, or by any other known method of controlling the dissipation of heat.

One or more embodiments of Bay 500 may include visual indicators, such as a light or an LED, to indicate when a battery has been properly seated in the bay and is charging. Furthermore, the Bay may have moulded slots to assist in the proper seating of a battery in the Bay.

Figure 5B:
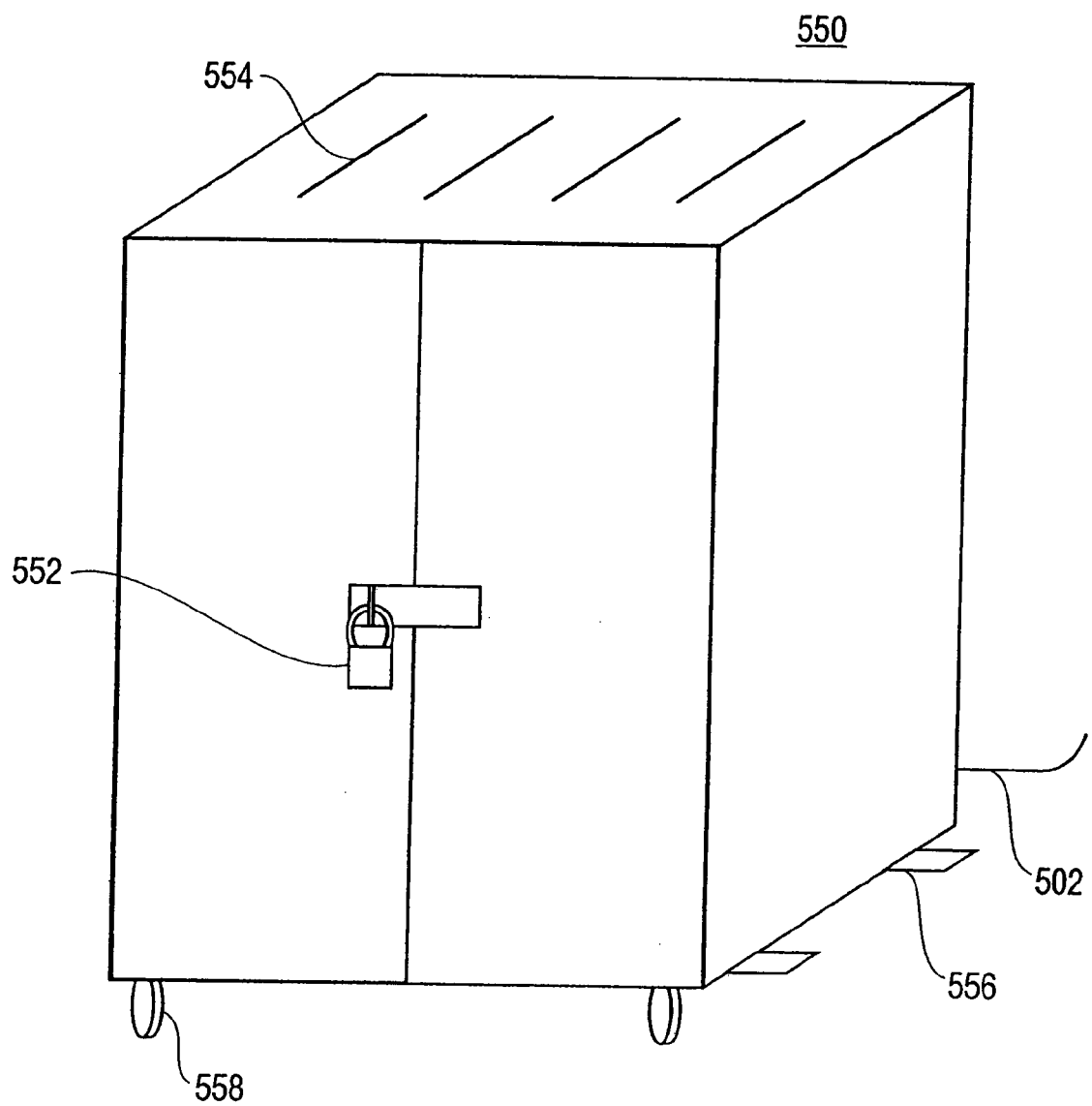

In a further embodiment, Bay 500 may be implemented as a separate, standalone unit. In a simple form, the Bay 500 described above may simply be removed from the Portable Computer Center 100. Alternatively, the separate unit may have a separate housing, such as the housing unit shown in FIG. 5b. Housing unit 550 may provide added security for protecting spare batteries from ambient environmental contaminants, and may also include one or more locking devices 552 to provide theft security as well. Locking device 552 may be in the form of a latch, padlock, or any other known locking mechanism. Housing unit 550 may also include one or more cooling vents 554 to dissipate heat. Other cooling mechanisms, such as a cooling unit or fan (not shown), may also be used to dissipate heat. Standalone unit 550 may incorporate some or all of the features described herein relating to the Bay 500, as well as additional features relating to the Portable Computer Center 100. For example, standalone unit 550 may include loops 556 to allow the unit to be secured against unauthorized removal, and/or wheels 558 to allow free movement of the unit.

Using a separate housing for Bay 500 may also allow the Portable Computer Center 100 to support a greater number of portable computing devices, without unnecessarily burdening the Center 100 with an inordinate amount of spare batteries. For example, any number of Centers 100 may share any number of housing units 550. In some embodiments, a single Center 100 might use one or more housing units 550 for the storage and/or charging of spare batteries, and might forego having Bay 500 within Center 100.

Figure 6:
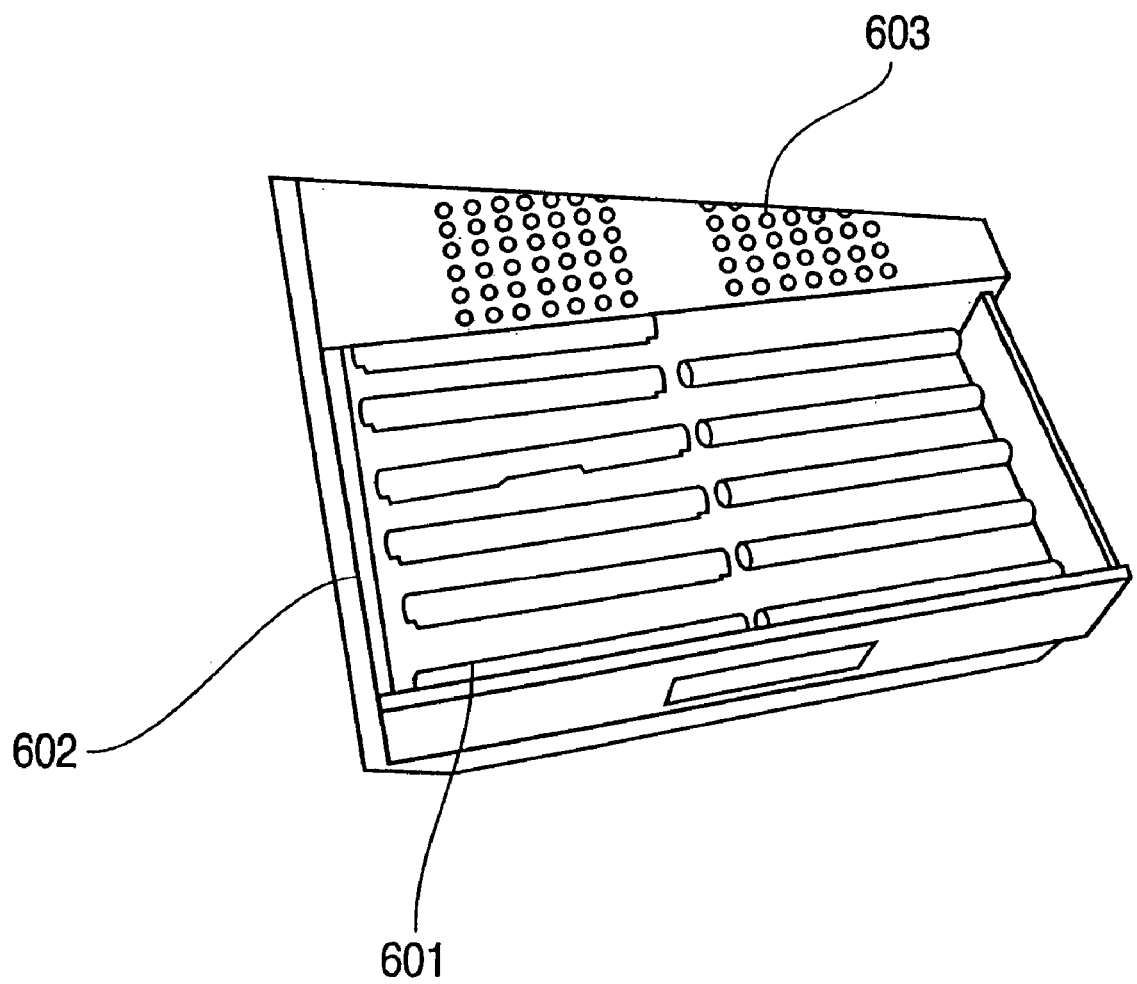
FIG. 6 is an isometric illustration of an open drawer containing spare batteries according to a further embodiment of the present invention.

FIG. 6 is an isometric illustration of a further embodiment of the present invention, showing spare batteries 601 in an open drawer 602 having cooling vents 603.

Figure 7:
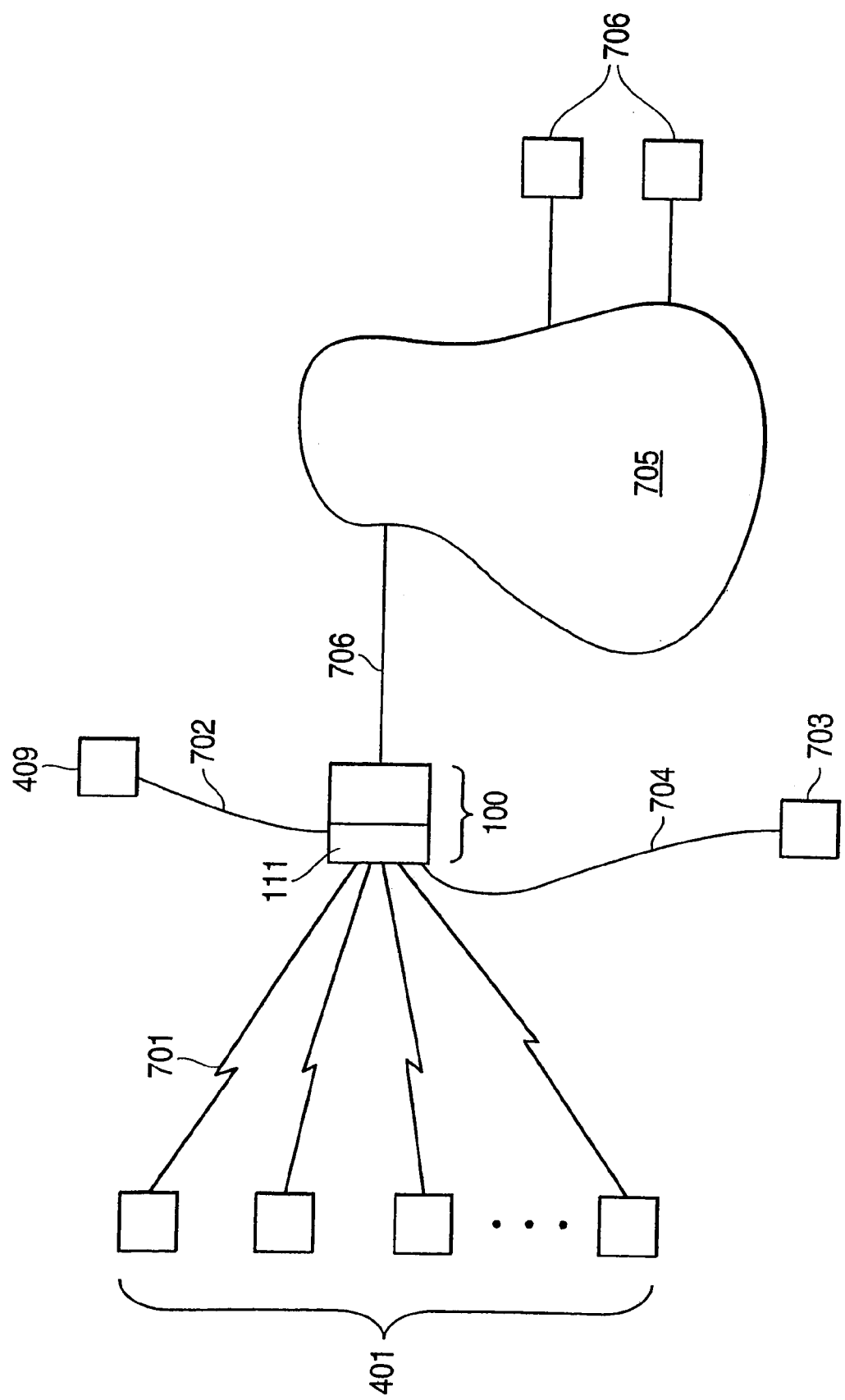
FIG. 7 is a block diagram showing various network communication connections of one embodiment of the present invention.

Referring to FIG. 7, a number of computers may be networked together through the Local Server 111. In this example embodiment, the Portable Computer Center 100 and Local Server 111 are used in a classroom environment to undergo teaching lessons on the computers. While the embodiment discussed below is in a classroom, the present invention is not limited to such settings, and may also be used for alternative purposes, such as a teaching seminar, business meeting, or any other situation in which a number of individuals need to use and/or share one or more computers.

In the FIG. 7 embodiment, a number of students are using computers 401 as part of a lesson in the classroom. The various lessons that may be running and/or used on the students' computers 401 will vary, and is discussed in detail further below. The various computers 401 may be communicatively coupled to the Local Server 111 of the Portable Computer Center 100 via one or more communication links 701. Communication links 701 may be wireless using radio-frequency (RF) transmission and reception with the wireless interface of Local Server 111. Communication links 701 may be all on a single RF channel, with signals for the different computers 401 being multiplexed (by, for example, time division multiplexing). Other methods of sharing the channel are also possible. For example, the computers 401 might use packetized transmission for an asynchronous protocol. Alternatively, some or all of links 701 may be wired using twisted-pair wire, coaxial cable, fiber, or any other form of wired communications. Having wired links 701 reduces the risk of unwanted interference, but comes at a cost of having physical wires strewn about the classroom.

In the FIG. 7 embodiment, the students are not the only ones shown with computers. There may also be one or more instructor's station computers 409. An instructor's computer 409 may be identical to student computers 401, or it may be different. In some embodiments, the instructor's computer 409 may have a different software configuration that includes certain software intended for use by the instructor or teacher. The instructor's computer 409 may also contain more advanced hardware and/or processing capabilities, which would be beneficial should the instructor's computer 409 be used to operate more complex programs than the students' computers 401.

The instructor's computer 409 in FIG. 7 is connected to Portable Computer Center 100, and Local Server 111, by connection 702. Connection 702 may be a wire bundle, and may contain wires (or cable, fiber, etc.) for carrying electrical power for the computer 409, as well as communication signals between the Local Server 111 and computer 409. In alternate embodiments, connection 702 need not be entirely wired. For example, instructor computer 409 might be configured to communicate data with Local Server 111 via wireless RF link, similar to the ones described above with respect to links 701. Instructor computer 409 might also contain a battery, similar to the ones in student computers 401.

Using instructor computer 409, it is possible for a teacher to conduct computerized lesson plans for students, who may follow along and/or participate using individualized student computers 401. The Local Server 111 may serve as a local server, facilitating communications between the instructor's computer 409 and one or more of the students' computers 401, and/or communications between computers 401. Local Server 111 may also simply communicate with computers 401, and may also provide additional processing capabilities.

Additional equipment may also be used. For example, one or more monitors may be placed on the Portable Computer Center 100 and connected to the Local Server 111 to display the contents of the instructor's computer 409 screen, or any one of the students' computers 401 screens. The details of the computerized lesson plans are discussed further below.

In the FIG. 7 embodiment, there may be more than one Portable Computer Center 100. For example, one or more additional Portable Computer Centers 100, (one is labeled 703 in FIG. 7) might be used in the same classroom, or elsewhere, such as a different classroom or building. The various Portable Computer Centers 100, 703 might be daisy-chained together to form a separate network of Portable Computer Centers 100, 703. In the FIG. 7 embodiment, another Portable Computer Center 703 is shown. While Portable Computer Center 703 may contain the same types of connections to computers discussed above with respect to Portable Computer Center 100, it may also include another connection 704 to the Portable Computer Center 100. Connection 704 may be wired, wireless, or a combination of wired and wireless types.

In this manner, the Portable Computer Centers 100 can communicate with one another, effectively allowing communications between teachers and/or students in different classes. Similarly, such a network may allow the various students and/or teachers to share resources, such as software, hardware, printers, scanners, etc. Shared hardware may also be located on a Portable Computer Center 100, and moved around to various locations as needed. In such an embodiment, the students might be able to print to a printer located on a Portable Computer Center 100, regardless of the actual whereabouts of that Portable Computer Center 100 at the time of printing. In another embodiment an instructor could simultaneously teach lessons to and/or monitor the work progress of two or more classrooms of students. It is also possible to install cameras and/or microphones on one or more Portable Computer Centers 100, 703 to permit this type of remote monitoring, and/or the use of multimedia communications.

If multiple Portable Computer Centers 100, 703 are used, it may also be possible for student computers 401 and/or instructor computers 409 to roam between locations and communication coverage areas of the Portable Computer Centers 100, 703. For example, a student might start the day in a first classroom, and have a computer lesson using computer 401 and Portable Computer Center 100. Later in the day, that same student might change classrooms, bringing the computer 401 with him/her. In the new classroom, the computer 401 may then communicate (by wire and/or wirelessly) with the other Portable Computer Center 703 for the next computer lesson. This would also enable a teacher to leave his/her own classroom and connect to a different Portable Computer Center to simultaneously monitor his/her own classroom while creating lesson plans or teaching in another. In some embodiments, the various student computers 401 and instructor computers 409 are able to communicate with a variety of different Portable Computer Centers 100, 703.

Since it is possible to have multiple Portable Computer Centers 100, 703, each communicating wirelessly with a number of computers 401, 409, the issue of RF interference may need to be addressed. The various Portable Computer Centers 100, 703 may be assigned a unique RF channel for wireless communications with computers 401 and/or 409. In such an embodiment, if a computer 401/409 roams from one Portable Computer Center 100 to another Portable Computer Center 703, then the computer 401/409 would need to switch communications to a different RF channel. Alternatively, the various computers may use asynchronous protocols, synchronous protocols, time division protocols, multiplexing protocols, packetized protocols, and/or any other type of method for sharing one or more frequencies.

The Portable Computer Center 100, or network of Portable Computer Centers 100, 703, may then be further connected to an external network 705 by one or more connections 706. Network 705 may be any communications network that is external to the Portable Computer Center 100, and may include a local area network (LAN) of the school, a telephone network, cable television distribution network, and/or the Internet (possibly through one or more internet service providers). The connection 706 depends on the type of network 705, and may generally be a wired connection, such as a twisted-pair wire, coaxial cable, optical fiber, T-1, etc. Being connected to the external network 705 offers many advantages. For example, the various students and/or teachers may use resources, such as software, that are located externally. For example, an entire class may take a field trip to a particular Internet site without ever leaving the classroom. On such a field trip, each student would be free to look about, and the teacher may be able to monitor and make sure that the students pay attention and do not go astray.

Figure 20:
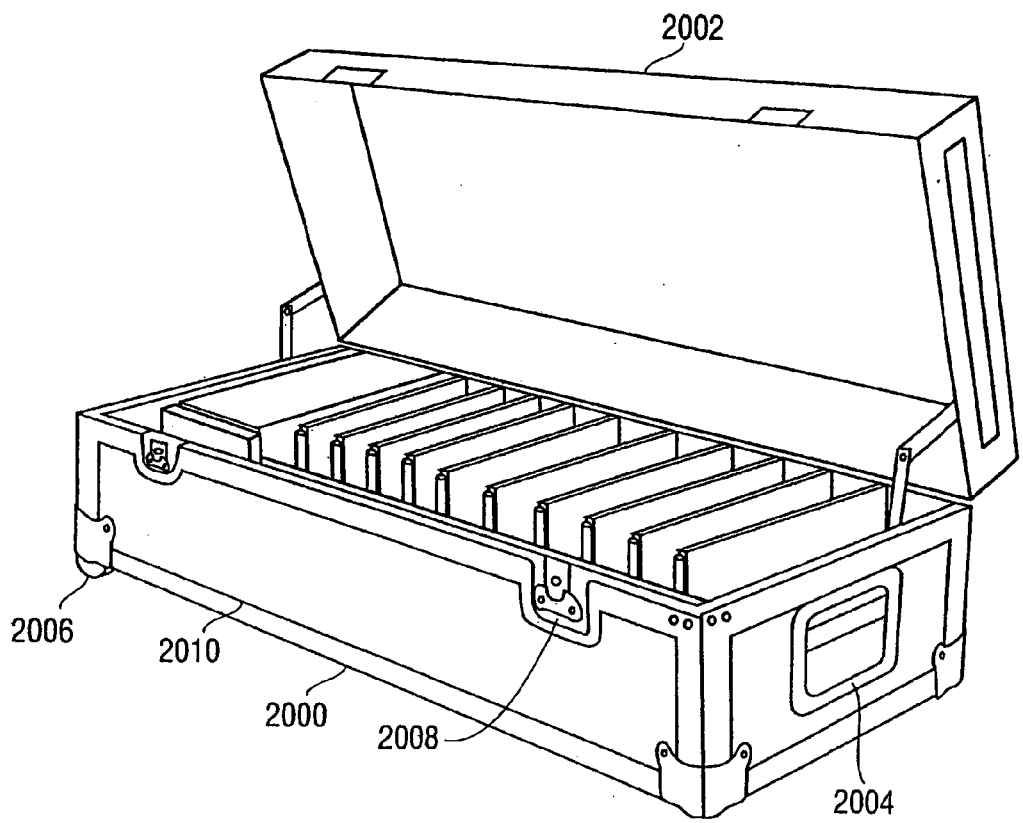
FIG. 20 shows a front isometric view of a further embodiment of the present invention, having an open lid.
Figure 21:
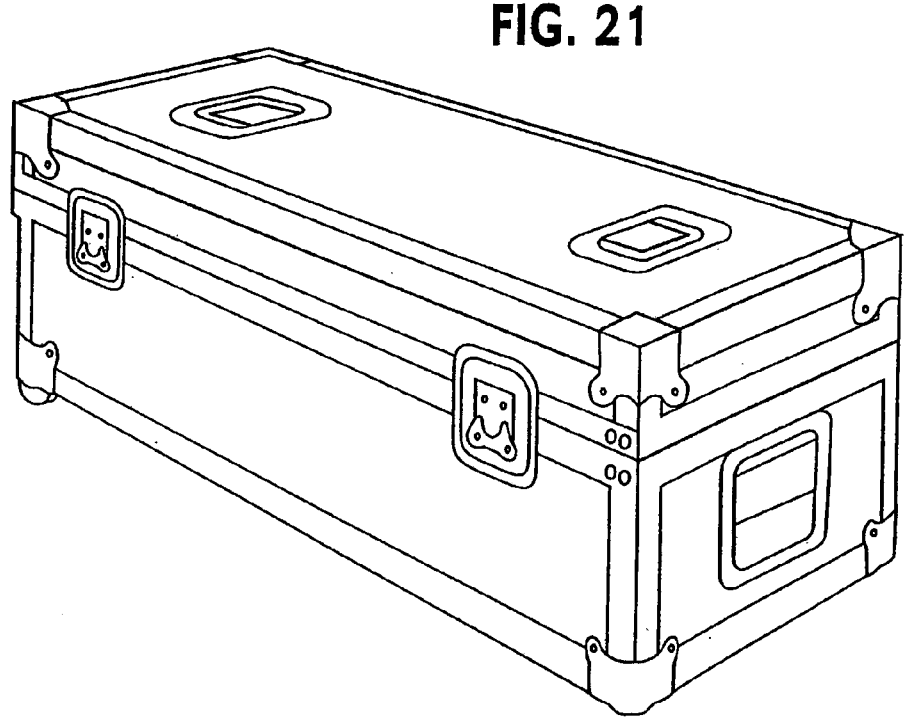
FIG. 21 shows another front isometric view of the further embodiment shown in FIG. 20, having a closed lid.
Figure 22:
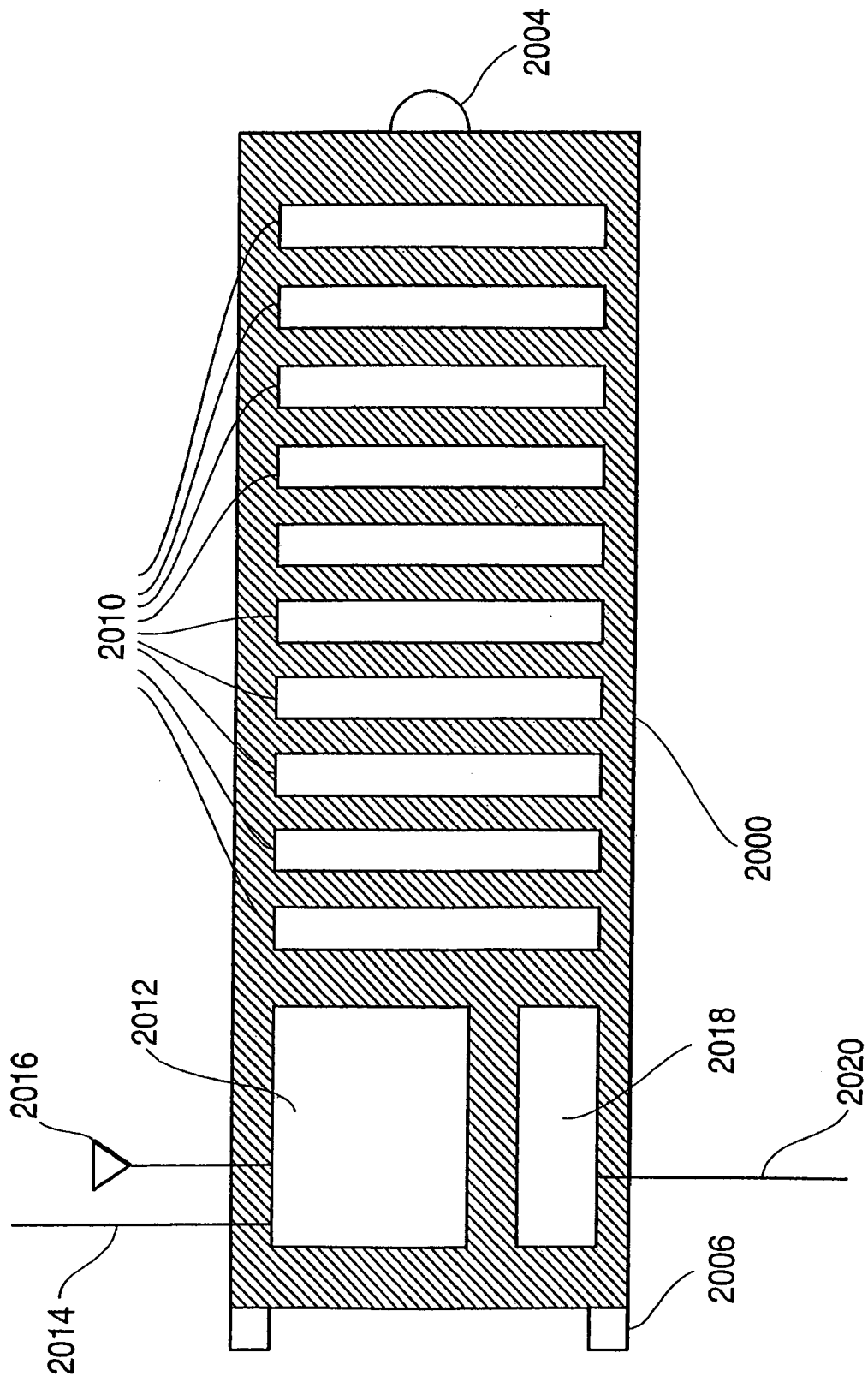
FIG. 22 shows a block diagram of the embodiment shown in FIGS. 20 and 21.

FIGS. 20–22 depict another example embodiment that provides a greater degree of mobility. As shown in FIG. 20, some or all of the capabilities of the Portable Computer Center 100 may be embodied using a portable case 2000. Portable case 2000 may be made of any durable material, and in some embodiments, may include a lid 2003, one or more handles 2004 and/or wheels 2006, which may simplify the transportation and improve the safety of the system. Portable unit 2000 may also have removable panels 2009 to allow for varying design colors, insignia, emblems, etc. In the FIG. 20 example embodiment, the case 2000 is shown to include a lid 2002 with clasps 2008 to secure the case in transit. FIG. 21 shows the same example embodiment with lid 2002 closed. This portable embodiment may be especially advantageous for individuals who travel from location to location, such as teachers who teach in multiple schools and/or school districts.

FIG. 22 is a schematic diagram of the example embodiment shown in FIGS. 20–21. As shown in FIG. 22, the portable unit 2000 may store a plurality of laptops 2010 within the case. Laptops 2010 may be similar to laptops 1000, and may have some or all of the same features found in those and other portable computing devices. In some embodiments, the interior of the case includes protective material, such as foam and/or padding, to help minimize movement of the laptops 2010 when in transit. Portable unit 2000 may also include Local Server circuitry 2012, which may provide the same functionality described above with respect to Local Server 111. For example, Local Server 2012 may include one or more connections 2014 (such as Ethernet line, phone line, coaxial cable, fiber, etc.) that may be used to connect the Local Server 2012 to an external network, such as a school's LAN. Connections 2014 may pass through an opening in the case of unit 2000 to allow connection with the lid 2002 closed. Alternatively, the unit may be designed to require that the lid 2002 be open in order to connect to an external network. Such a requirement may simplify the design of the casing for unit 2000, and may also ensure increased ventilation by requiring the open lid 2002. Local Server 2012 may also include circuitry for communications with portable computers 2010, such as through a wired or wireless connection. In some embodiments, Local Server 2012 may include an RF antenna 2016 for communicating with computers 2010. As with the connection 2014, antenna 2016 may pass through an opening in the casing for unit 2000, or alternatively, may simply require that the lid 2002 be open for operation. In further embodiments, antenna 2016 may be integrally formed with some or all of unit 2000 to conserve space. For example, antenna 2016 may be implemented using wiring that extends into lid 2002, or into the foam/padding of the casing.

Portable unit 2000 may also include power supply circuitry 2018 for recharging batteries within laptops 2010 when they are plugged in. Circuitry 2018 may be the same as that described with respect to FIGS. 4 and 5a, and may have the same capabilities (such as the current-limiting circuitry, or a 300 Watt supply). One or more power lines 2020 may also be included for connection to one or more external power sources. In some embodiments, insertion of laptops 2010 into the unit 2000 automatically connects the laptop 2010 to power supply circuitry, while other embodiments may allow laptops 2010 to be stored without plugging them into the power supply. In this manner, it is possible to store laptops without necessarily charging them, which may be helpful for those laptops that do not need further charging.

In general, the components within portable unit 2000 may replicate the components within any of the other embodiments disclosed herein. Alternatively, portable unit 2000 may include reduced circuitry and/or capabilities in order to conserve space and/or minimize the overall weight of unit 2000. Use of the unit 2000 may be identical to that of the Portable Computer Center 100 described above. Furthermore, one or more of the laptops 2010 may be used as a teaching station for the other laptops. In this manner, a teacher need only bring the portable unit 2000 to have all the computing hardware necessary for a lesson. Alternatively, a teaching station may be implemented on a different computer or laptop configured to communicate with Local Server 2012 through connection 2014 and/or other wired or wireless methods (such as RF communications with antenna 2016). Such an alternate embodiment may be advantageous because it allows a greater number of laptops 2010 for the students, and may help traveling teachers take advantage of computing facilities available at various locations.

The Portable Computer

Figure 9:
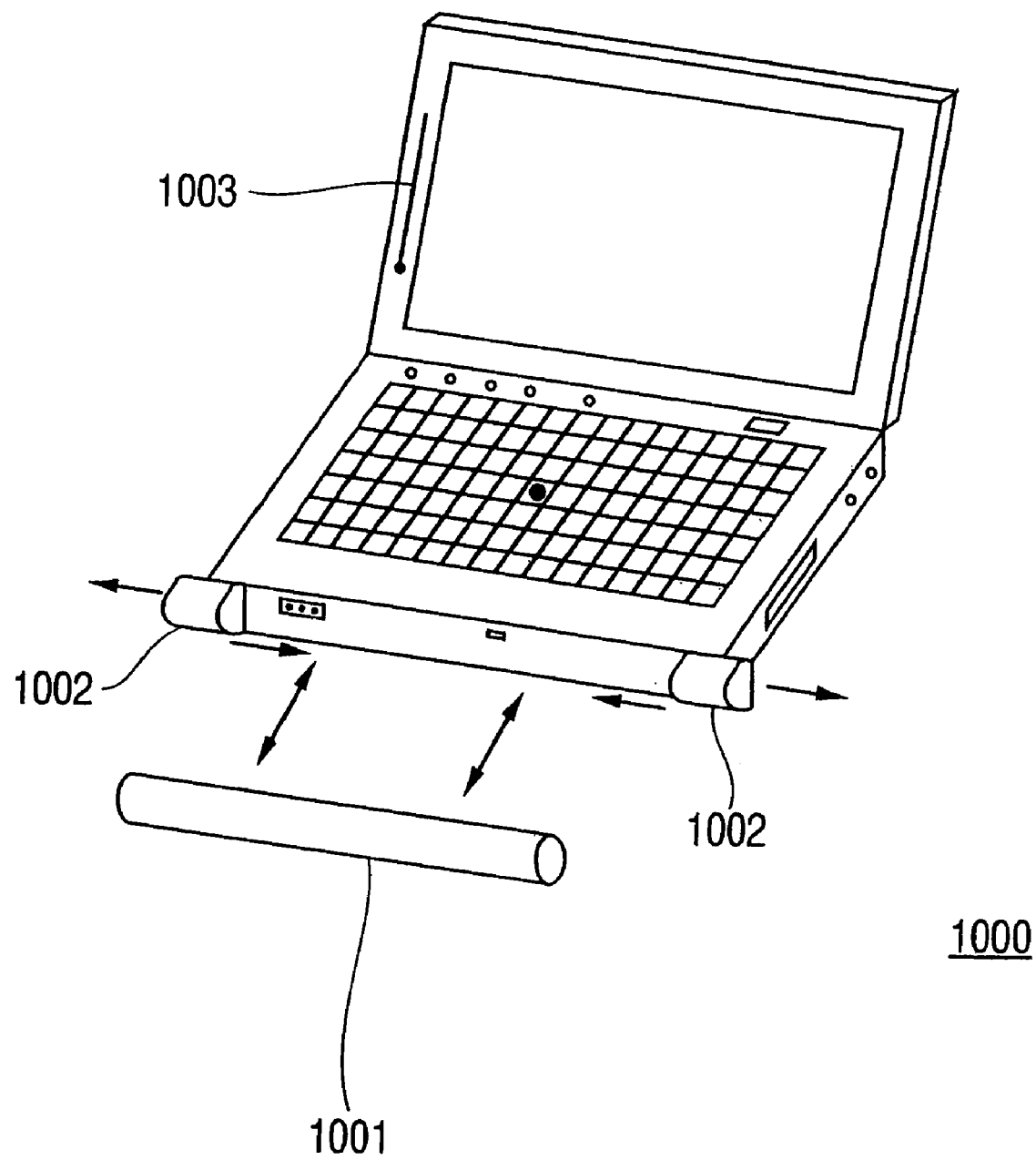
FIG. 9 shows a top frontal isometric view of a portable computer according to one embodiment of the present invention, with battery in exploded view.

FIG. 9 shows an exemplary embodiment of a portable computer 1000 that may be used with the Portable Computer Centers 100, 703 of the present invention. The portable computer 1000 is functionally similar to a standard laptop computer, generally serves as a portable workstation, and can operate as computer 401 or 409 discussed above. The portable computer 1000 may include one or more processors, memories (static, dynamic, RAM, ROM, etc.), and input/output interfaces (e.g., screen, keyboard, mouse, etc.).

An exemplary embodiment of the portable computer 1000 is also equipped with a rechargeable battery 1001 across the front. One advantage of such a location enables the user to use the battery as a wrist support. This location of the battery may also help reduce the size of the laptop, prevent battery heat from rising through other equipment inside the laptop, and make removal and replacement of the battery more convenient for users of all ages. The battery 1001 may be easily removed by sliding out two opposed, biased (e.g., spring-loaded), release switches 1002. Although the battery 1001 is shown to be across the front, a similar battery may be located elsewhere as well (such as on a side, or along the back).

Figure 10:
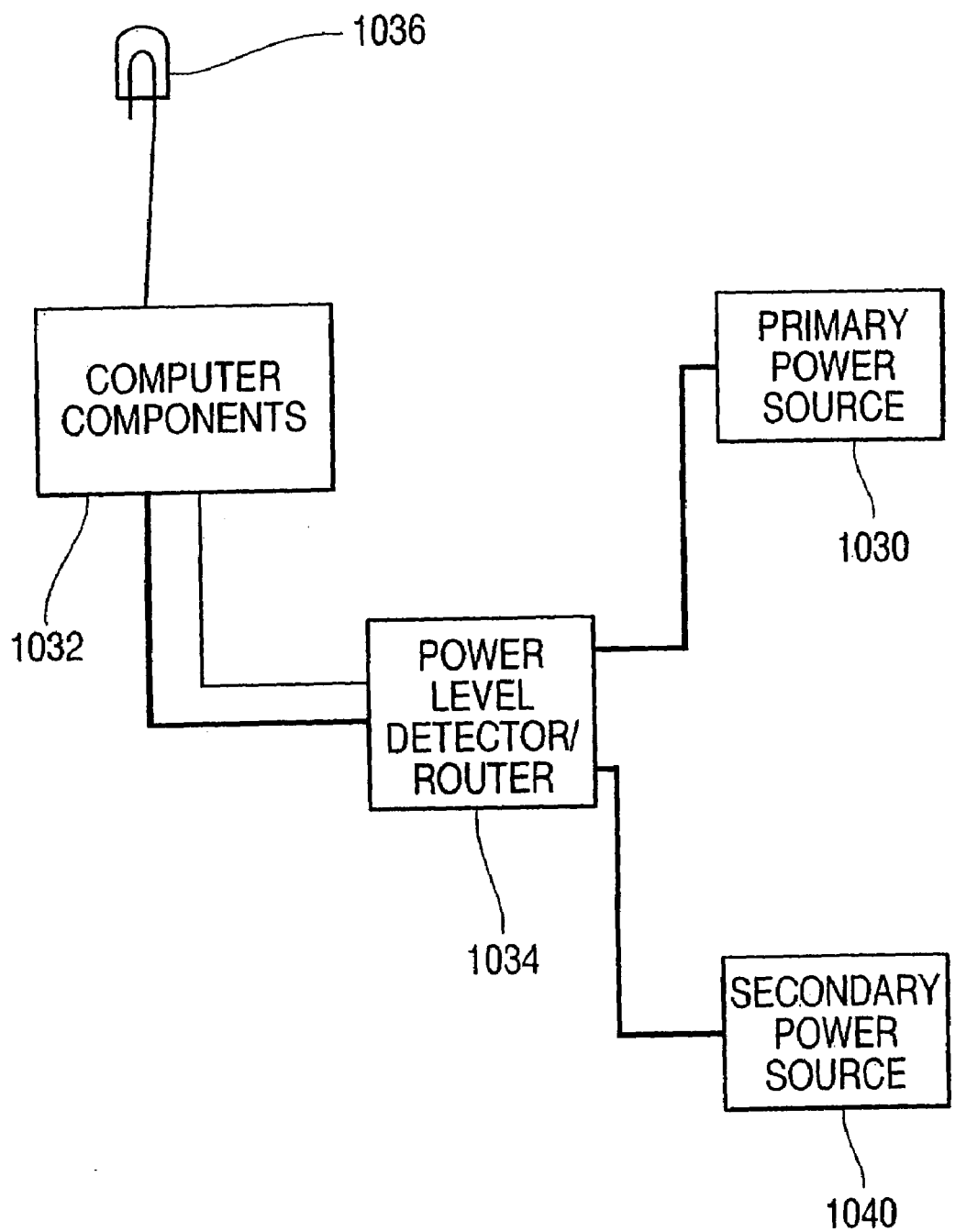
FIG. 10 shows a functional diagram of an electrical power configuration for an example embodiment.

The removable battery 1001 allows the computer user (e.g, students and/or teachers) to exchange a depleted battery with a freshly-charged one to allow continued use. However, many typical laptop computers require the laptop to be deactivated in order to exchange batteries. Such deactivation is undesirable, particularly in a teaching environment, because of the stoppage in the learning process. In further embodiments, the portable computer 1000 may include a reserve source of electrical power to allow the computer to continue to operate after a depleted battery is removed and before a fresh one is inserted. FIG. 10 shows a functional diagram for an exemplary power configuration for operating a portable computer 1000. In FIG. 10, a primary power source 1030 provides electrical power to the other components of computer 1000, represented as 1032, during normal operation. A power detector 1034 detects the power level (or voltage level) provided by primary power source 1030, and if this power level should fall below a predetermined level, a signal may be provided to the computer components 1032 to warn the user that the primary power source needs replacing. This warning may take the form of a light-emitting diode 1036, an audible tone, a message or symbol on the computer 1000 screen, or any other form of indication to the user.

Power detector 1034 may also include power-switching circuitry to route the electrical power that is supplied to the components 1032 such that, when the primary power source 1030 is insufficient or removed, electrical power may be received from a secondary power source 1040. Secondary power source 1040 may be implemented using a standard power supply connected to a wall electrical outlet, or one or more additional batteries (which may be rechargeable). Secondary power source 1040 may also be implemented using any other form of uninterrupted power supply circuitry, such as capacitor-based solutions or power switching devices currently offered by, for example, Linear Technology Corporation. Power detector 1034 may also include circuitry for determining when to switch from the secondary power source 1040 back to the primary power source 1030 when, for example, a fresh battery is replaced. Using one or more of these features, the user may successfully change the battery 1001 of the computer 1000 with minimal interruption of the computer's use (e.g., in the middle of a lesson).

The portable computer 1000 may also contain additional features. For example, the portable computer 1000 may be equipped with a built-in wireless interface (RF, IR, etc.) to communicate with one or more Local Servers 111, and may also have a built-in antenna 1003 for RF communication. In some embodiments, antenna 1003 may be located internal to the unit, for example as part of an integrated RF communications card. In an example embodiment, the portable computer 1000 may be smaller and lighter than most laptop computers for convenient storage and use by younger students. According to one embodiment, the portable computers 1000 may be used by students, and do not include a disk drive or CD-ROM drive. Without such drives, the educator is assured that the student will not be loading or introducing unauthorized programs into the portable computer 1000. To load programs onto these machines, the Local Server 111 may simply transmit them wirelessly, or alternatively, the programs may be loaded through a port (e.g., serial port, parallel port, etc.) connection. This loading/downloading may occur when the computers are stored in the Portable Computer Center 100.

Additionally, since the laptops may be used by young students, the laptops may have additional environmental protection, such as a spillproof keyboard (e.g., implemented with a membrane over and/or under the keys, or with a touchpad), to withstand increased risks of damage. One or more of the computers described herein may use a wireless keyboard, to allow for greater flexibility in use.

Figure 11:
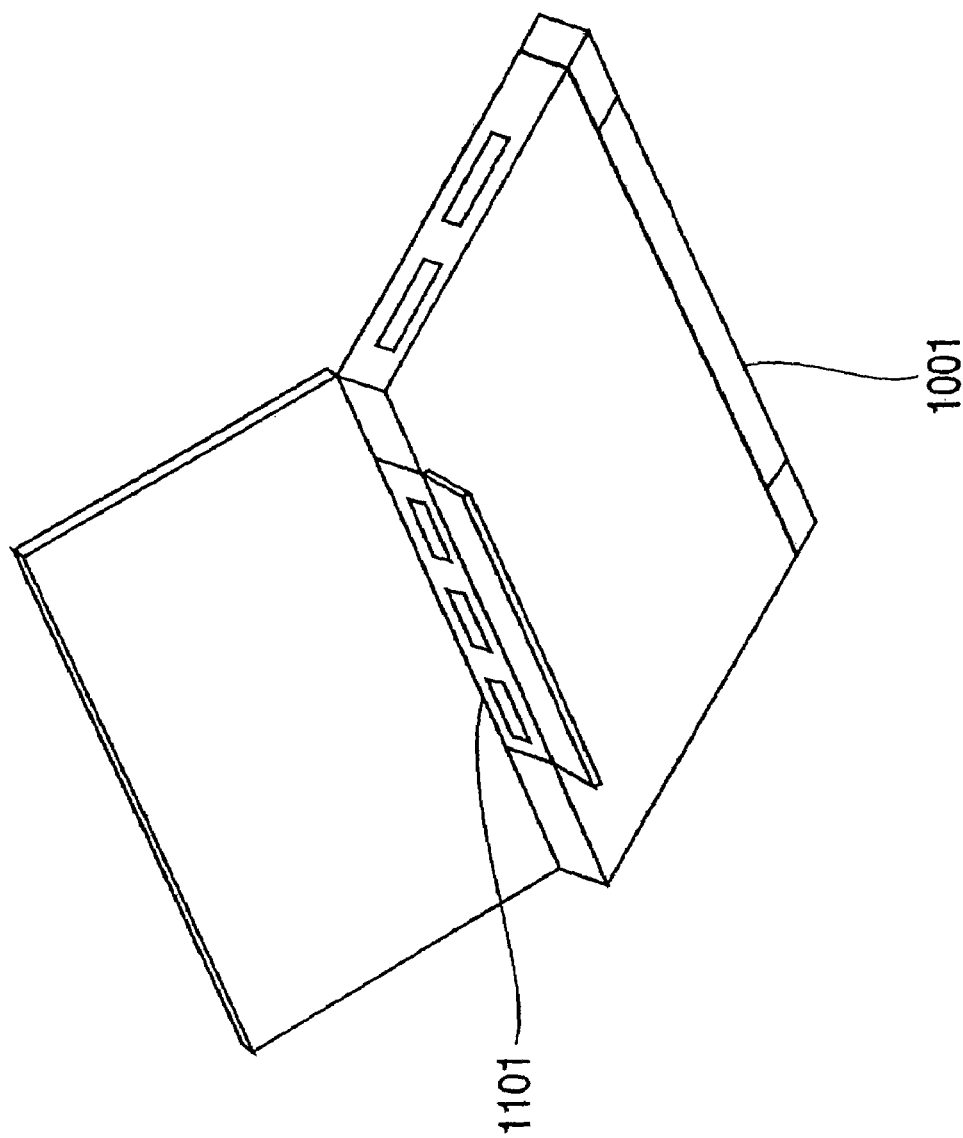
FIG. 11 shows a bottom rear isometric view of a portable computer according to a further embodiment of the present invention, with battery in exploded view.

FIG. 11 shows an isometric rear underside view of the portable computer 1000. Visible in FIG. 11 are a number of ports 1101 that may be used to connect the portable computer 1000 with external networks and/or sources of data. For example, the ports 1101 may include a port for connection with the Local Server 111 by cable. Ports 1101 may also include connections for external devices, such as a mouse, monitor, external disk drive (or CD drive), printer, scanner, etc.

Teaching and Communications

An example embodiment of the present invention allows a computer 409 to interact with, monitor, and even control the operation of other computers 401. In one embodiment, computer 409 may be used by a teacher or instructor, while other computers 401 may be used by students. In this embodiment, the teacher may use computer 409 to conduct a computer lesson, and the students may follow along on their own computers 401. The teacher may also use a centralized point of attention, such as a monitor on the Portable Computer Center 100, for some or all of a particular lesson.

In one exemplary embodiment, the teaching of a lesson may be enhanced significantly through the use of an Instructing Software Program that operates on the teacher's computer 409, and/or, in whole or in part, in each student's computer. The Instructing Software Program may be configured to enable a user (e.g., a teacher) to manage, interact with, and monitor other users (e.g., students) linked to a common network (e.g., the Portable Computer Centers 100, 703). For example, a teacher of a class may use the software to teach a lesson to users from the teacher's workstation, while simultaneously monitoring the work of all the student users from that same workstation. The device may be configured to identify each student by number or name. In the event the student is identified by name, the student may be asked to input his or her name as part of a log on process.

Referring to FIG. 12, an embodiment of this software could enable such a teacher to interact with student users through screen 1200, a graphical interface on the teacher's workstation (e.g., computer 409) screen. The screen may be configured to display one or more "thumbnail" images 1201. A thumbnail image is essentially a reduced-size image corresponding to the image displayed on a screen of a computer being used by a student (e.g., computer 401). The plurality of thumbnails shown in FIG. 12 allows the teacher to simultaneously view user activity on all computers 401 being used by students. Such monitoring may be helpful to ensure that students are keeping up with a particular lesson, or that they are not misbehaving.

In one embodiment, the teacher's computer 409 is equipped with a touch-sensitive display screen. In such embodiments, the teacher may select one or more of the students' computers 401 simply by touching the corresponding thumbnail. The teacher could also employ other means to select one or more particular computers 401, such as direct entry of an identification of the particular computer and/or student, selecting a thumbnail with a mouse, or moving a cursor to the desired thumbnail.

The teacher's display screen 1200 may also include a Chat Window 1202 to enable a teacher to communicate with one or many of the students in the class. In one exemplary embodiment, the teacher would first identify the student(s) with whom the teacher wished to chat. The chat feature may be accomplished in numerous ways. For example, the teacher may select one or more of the thumbnails 1201 using any of the methods described above. Alternatively, the teacher may select to send a "chat" message to all computers 401 by pressing a graphical button for "Select All" 1206, by "clicking and dragging" a box around the thumbnails, or by any other equivalent method. If the teacher's chat message is in response to a message received from a student, the teacher might simply select a "Reply" graphical button 1207.

Once the desired student(s) have been selected, the teacher may then type in a message that will be displayed on the student(s) computer(s). Similarly, messages typed by the student(s) will appear in the teacher's chat window 1202.

In alternative embodiments, the chat window 1202 may simply serve as a, "bulletin board", accessible by students and teachers alike at any time. In one exemplary embodiment, one or more of the teachers and/or students may post a message to the chat window 1202 simply by selecting the chat window function (e.g., by highlighting the window) and typing the message. In this alternative embodiment, messages may easily be posted to chat window 1202, and the entire class may see the message and its response from the teacher (or other students). As a further embodiment, if a bulletin board type chat window 1202 is used, private messages may also be sent between teacher and student using the methods described above. As a further embodiment, the chat window 1202 may serve as a virtual chalkboard, on which a student may be asked to type or enter information for the class to see.

One particularly beneficial use of an exemplary embodiment of the present invention would allow a teacher to assist selected students who are having trouble with a specific program or lesson by communicating and corresponding with them through chat messages.

Additional features may also be provided to the teacher through the instructor's screen 1200. For example, a "Take Control" button 1203, when selected, may allow the teacher to assume control over one or more selected computers 401. Using such a function, it may be possible, for example, for the teacher to execute and/or demonstrate particular steps from the teacher's own computer 409, and have those steps be replicated on each of the selected computers 401 as well. In this manner, the students may witness first-hand the steps taken by the teacher. In one embodiment of the "Take Control" function, a window will appear on the teacher's computer 409 screen, displaying the same screen shown on the student's computer 401 screen. The teacher may then highlight this window, and enter keystrokes, screen touches, menu selections, and/or other inputs, and those inputs will be transmitted to the student's computer 401 as if entered by the student directly.

A "Blank Screen" button 1204 may allow the teacher to erase or clear the screen and/or work of any student at any given time during classroom activity or instruction. In an exemplary embodiment of this function, a teacher may use the blanking function to prevent unwanted use of a workstation by any student user.

A teacher may also be provided with a "Broadcast" graphical button 1205, enabling the teacher to broadcast one or more selected screen(s) to a central monitor, and/or to the screens of other computers 401, 409. Referring to FIG. 13, one exemplary embodiment of the broadcast function would enable a teacher to broadcast one student's computer monitor display onto a broadcast window 1300 to serve as an example to other students. The broadcast window 1300 may be the display seen on the students' computer 401 screen(s), the teacher's computer 409 screen, or both. Another exemplary embodiment of the Broadcast function would enable the teacher to broadcast general information such as lesson plans, selected web-pages, and/or a presentation to the entire class. In such situations, the broadcast window 1300 might occupy the entire screen of the students' computers 401.

Another feature that may be provided is a "Select All" graphical button 1206 that would automatically highlight all student computers 401. Using this button, the teacher may quickly highlight all students for a particular function, such as sending a message in the chat window 1202 to everyone in the class, blanking everyone's screen, and/or taking control of all computers 401.

Similar software may also be used for the students' computers 401, and as such, the students' computers 401 may include any of the features described above, or any combination of those features. However, the students' computers 401 might not necessarily offer the same range of features. For example, student computers 401 might not display the thumbnail images 1201 that may be seen on the teacher's computer 409.

Another graphical button that may be provided is the "Download/Execute" button 1208. Using this button, the teacher may select a particular program to be downloaded to, and/or executed by, the students' computers 401. Such programs may be originally stored in students' computers 401, teacher's computer 409, Local Server 111, at a remote source 706, or anywhere that may be communicatively connected to the students' computers 401, such as the internet. In one exemplary embodiment, the teacher may press the Download/Execute button 1208 to select a particular quiz program to be submitted to the students' computers 401. The quiz program may then be executed on the computers 401, administering a "pop-quiz" to the students. As will be discussed below, these answers may be gathered by the computers 401, transmitted to another location (e.g., the Local Server 111, teacher's computer 409, etc.), and may also be automatically graded for accuracy.

Testing and Scoring

Embodiments of the present invention may be further enhanced through the use of testing software. The testing software may be configured to enable a user, software product, or online product to quiz and test other users on a network workstation, along with grading and analyzing their work.

In one embodiment, a teacher may first use the testing software to generate a quiz comprising of a series of questions. In one exemplary embodiment, shown in FIG. 14, the testing software may provide the teacher with a listing of existing quizzes 1401, and the option to create a new quiz 1402. The testing software may also provide the teacher with a listing 1403 of the various questions that have been created for a selected quiz, as well as the correct answers, type, and/or point value (point value not shown) for each question.

For security purposes, this portion of the testing software may first require the entry of a teacher password before displaying any of the quizzes or questions.

Figure 15:
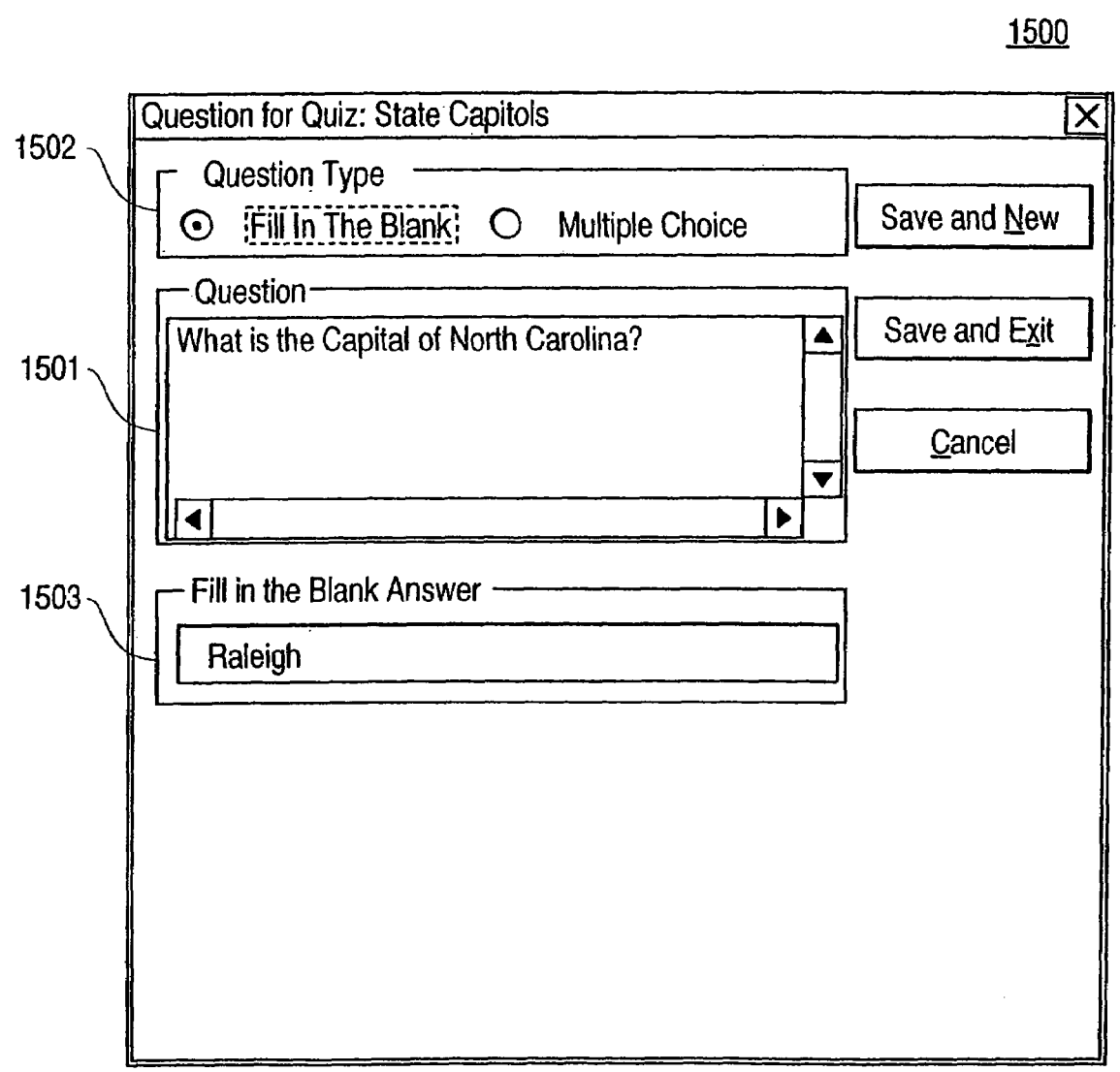
FIG. 15 shows another graphical window of a testing program according to one embodiment of the present invention.

Referring to an exemplary embodiment shown in FIG. 15, a teacher may use the testing software to create a question, or set of questions, for a quiz. The teacher may enter the text of a question in a question area 1501 of a pop-up 1500, where the question will be presented to the students during the quiz. The question need not be merely textual, however, and may include audio sounds and/or visual images. In one particular embodiment, the testing software may include a question type prompt 1502. The teacher may use this prompt to identify a question type for the current question. Question types may include any type of question desired by the teacher, and may include, for example, true/false, multiple choice, short answer, long answer/essay, and mathematical problem-solving, etc. The teacher may also prepare an answer for the question using the answer prompt 1503. In this area, the teacher may simply enter one or more desired answers for the particular question, or one or more keywords that should appear in the correct answer. Because the students' answers may be graded by computer (as will be described below), the teacher may also specify whether a particular question should be ignored by the grading computer and graded personally. Some questions, such as mathematical questions requiring students to show their work, or long essay answer questions, are more accurately graded by an individual. However, should the teacher choose to do so, all questions of all types may be graded by computer.

The computer lessons and/or quizzes may be obtained from other sources as well. For example, a teacher could load the lesson or quiz onto the teacher's computer 409 and/or Local Server 111 from a separate disk, such as a magnetic or optical. Lessons, quizzes, and/or other programs may be retrieved via the external network 705 as well. Another embodiment would enable a teacher's computer 409 and/or Local Server 111 to download such questions off of a network server or internet web-site. An example of testing material would be Java-based teaching tools to aid a student in learning a subject. Such applications may be loaded onto the students' computers 401 and executed.

Referring again to FIG. 14, a teacher may review all of the questions being posed and make any final corrections before saving and distributing the quiz to the students. A teacher may also save the already created quiz and begin preparing a new one.

Figure 16:
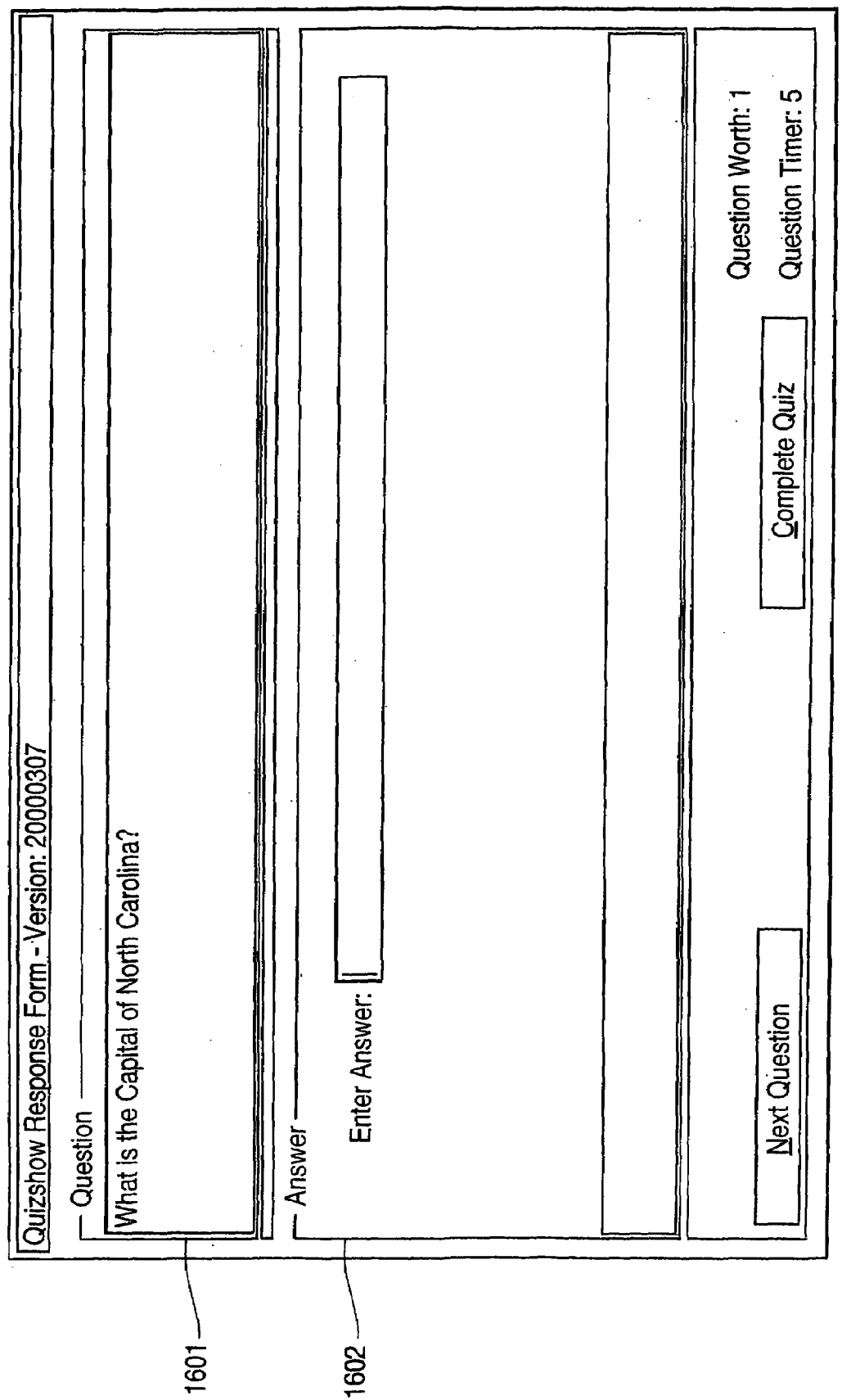
FIG. 16 shows a graphical window of a testing program provided to a student according to one embodiment of the present invention.
Figure 19:
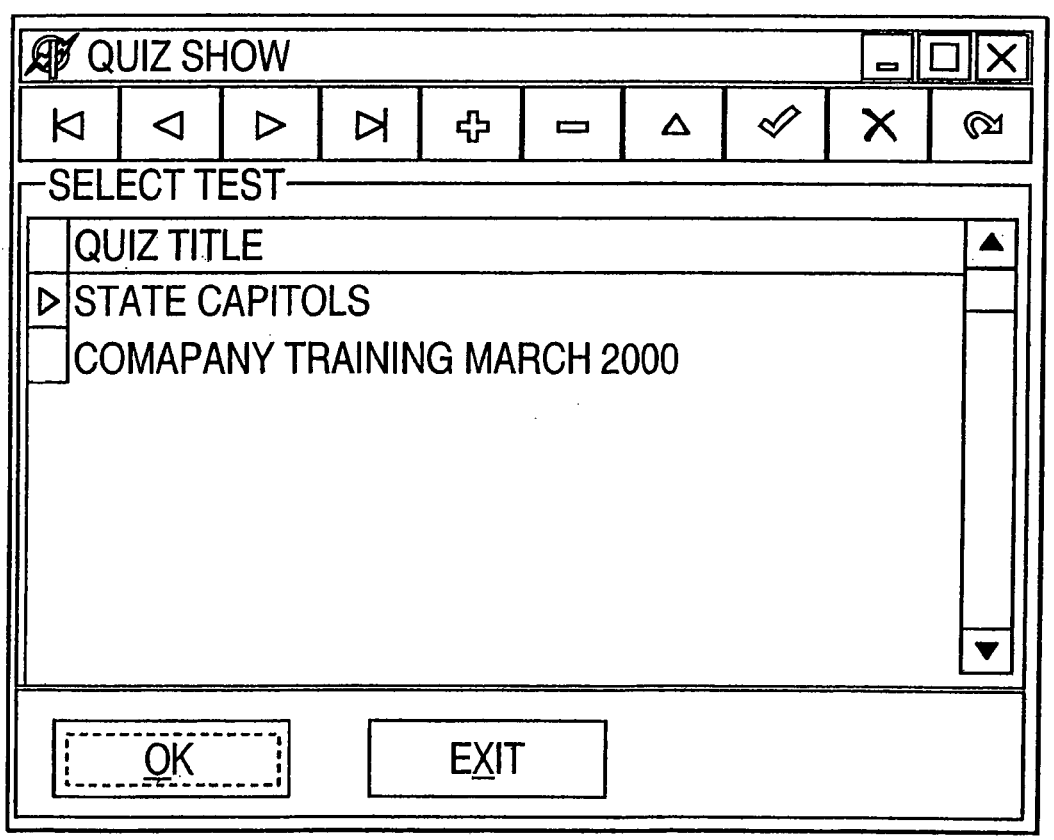
FIG. 19 is another graphical window of a testing program according to one embodiment of the present invention.

Once the quiz has been distributed to the students, the testing software may execute a program on the students' computers 401 to administer the quiz. Embodiments of the screens that may be displayed to the students during these quizzes include the screens shown in FIGS. 16 and 17. In one embodiment, shown in FIG. 16, the testing program may cause computers 401 to display a series of prepared questions or instructions. The software may display a question 1601 and provide a space 1602 for a student to provide an answer. Referring to the FIG. 17 screen, as the student enters answers, the student may select graphical buttons to go back to work on a prior question 1701, continue to the next question 1702, or complete the particular quiz 1703. During the setup of the quiz, the teacher may choose to have the software time the student, in which case a clock or timer 1704 may appear in the quiz window. The screen may also indicate a value 1705 of the current question, such as a point value.

The students' answers need not be limited to textual answers, and may comprise of other forms of input, such as speech, selection of an image or portion of an image, selection from a predefined list, etc. The exemplary screen shown in FIG. 17 depicts, as an example, the multiple choices available to the student for a multiple-choice question. Other embodiments may vary. For example, a question may include an image with text, asking the student to identify (e.g., by pointing and clicking with a mouse and/or cursor) the area of the image showing a particular item (e.g., identifying the stamen on a picture of a flowering plant).

As mentioned above, the students' answers may initially be gathered by the various student computers 401. Depending on the testing program configuration (which may be selected by the teacher), some or all of the students' answers may be graded automatically. Automatic grading will greatly simplify the administration of quizzes and tests, and will reduce the time needed for identifying students' strengths and weaknesses. The automatic grading process may involve comparing an answer entered by a student with the predefined correct answer. This grading process may include "fuzzy" logic searching to accommodate for minor spelling variations (unless, of course, the teacher wishes to require 100% accurate spelling as well), and/or other intelligent means to automatically grade a student's answers.

The automatic grading may be performed by the computers 401, and may even be performed as the answers are received. If student computers 401 grade the answers, this reduces the amount of information that must be transmitted back from the computers 401 at the conclusion of the quiz. For example, each computer 401 might only need to transmit scoring information, such as number of points earned and/or time taken, to the teacher's computer 409 (or any other system that maintains the scores, such as the Local Server 111, another Portable Computer Center 703, etc.). Such a grading program may be installed on the students' computers 401 by wireless transmission, by diskette, when the computers 401 are plugged-in for recharging, or by any other known means of transmission of data.

Alternatively, the answers may be transmitted to the Local Server 111, teacher's computer 409, and/or any other system for grading. For example, the answers may be transmitted to a grader connected to external network 705. In these embodiments, it may be possible to have a centralized computer, such as one connected to network 705, or the teacher's computer 409, conduct the grading. Such a configuration may require the transmission of more information (e.g., the initial transmittal of the answers and/or grading program to the students' computers 401, and the subsequent transmittal of the answers from the students), but it may provide a greater degree of confidentiality. For example, in such a configuration, the quiz answers may be maintained at the grader's site, such as with the teacher's computer 409, with no risk that the answers may be accidentally displayed on a student's computer 401.

Portions of the testing software may reside on the teacher's computer 409, students' computers 401, Local Server 111, and any other location as needed to carry out the functions described herein.

Referring to FIG. 18, in one exemplary embodiment, the testing software may grade the student's answers and provide results to the student and teacher for review in a review window 1800. In this particular embodiment, the software may track student quizzes, report this progress to a teacher, and even send a final report at the end of such designated grading period. The software may keep track of quiz-taking statistics. For example, the software may track the amount of time the student took to answer each question, or the time it took to take the entire quiz. The software may disclose the number of points earned per question, the number of questions the student answered correct, and the final percentage score the student received in answering the questions. The software may track student progress by recording past scores and/or performance at a predetermined location (such as at Local Server 111) and allow access to student histories by assigning a means to log in (e.g., a password). In an exemplary embodiment, the software may even track and point out student weaknesses and strengths in taking each quiz and over a period of time.

The software may apply adaptive learning technologies utilizing the software lesson or quiz to apply artificial intelligence and/or adaptive programming to test each student with respect to their particular strengths and weaknesses. For example, the software provider could track a class of students' progress over a period of time, and as certain students prove more adept at particular subjects, the provider could supply more difficult lessons, projects, or exams to reflect that students aptitude in that area of learning. At the same time, the software provider could continue at a slower pace of learning for a student having difficulty with certain topics to help that student develop in that particular topic of study. Accordingly, a teacher's effectiveness may be improved by allowing different students, having different capabilities, to undertake lessons of varying difficulty and/or scope.

External Lesson Plans

Embodiments of the present invention may be further enhanced through the use of external lesson plans. Having the present invention connected to the external network 705 relates to obtaining programs and lesson plans that may be used with the Portable Computer Centers 100, 703. The external network 705 may be accessed to retrieve and/or download computerized lesson plans from a remote source, such as lesson providers 706, and employ them in a teaching curriculum. These lesson plans may be used separately or in conjunction with the Teaching and Communications and Testing and Scoring software to apply some or all of the previously mentioned advantages, such as monitoring student progress and using adaptive learning technologies, to enhance student learning.

In fact, one aspect of the present invention involves a remote source of lessons 706. A set of lesson plans that may be supplied by a remote source 706, and used with computers 401, 409, may be as brief as a simple screen of textual information. However, lesson plans may also be much more complex. For example, the lesson plan might include one or more computer programs that provide a video, audio, and/or multimedia presentation to the students about a particular subject. The lesson plans may also include one or more interactive programs that may be loaded on computers 401 and/or 409 and executed, increasing student involvement. For example, the lesson might include an interactive video game-type contest to see which student can identify the most mammals in a nature scene, or which students can quickly spot a misspelled word in a paragraph.

The lesson plan might include one or more class projects designed to assist the students in learning a particular lesson by asking them to carry out a task or work together toward a common goal. For example, in one exemplary class project lesson, the students' computers 401 may step the students through the process of solving a particular mathematical problem or quiz and test students on multiple subjects. The lessons may also be of varying duration. For example, one overall lesson might call for a semester's worth of daily lessons. Such lessons might, for example, cover the entire Civil War, or the geography of the entire United States, a portion at a time.

A lesson may also call for the retrieval of information located elsewhere on the external network 705. For example, a lesson on the U.S. economy may include a segment in which a current stock price quotation is retrieved from the Internet. Similarly, virtual class trips may be taken to one or more Internet sites or Web pages. In an exemplary embodiment, one or more computers 401 and/or 409 may be connected to the particular site of interest.

Remote source 706 may offer an extensive library of predefined lessons for downloading to various schools. These lessons might include lessons on the solar system, photosynthesis, dinosaurs, spelling, algebra, etc. The remote source 706 might also offer one or more customized lessons that may include sessions tailored specifically for particular geographic regions, states, counties, school districts, schools, or any other entity desiring a customized lesson. For example, school districts in southern Florida might desire Social Studies lessons having more detail on the relationship between the United States and Cuba, while schools in Michigan might want similar detail on the relationship between the United States and Canada. Some schools may have different standards and/or requirements (such as math proficiency), and may desire slightly varied math lessons. For example, some schools might wish to have Calculus included as a standard math lesson, while others might not. The remote source 706 may also offer one or more customized lessons to adapt to different styles of learning. For example, having a lesson plan for a student who excels in a particular subject matter while having a lesson plan teaching the same topic tailored for students with certain learning disabilities who may have difficulty learning in that same subject matter. Additionally, topics and/or lessons may be taught in different languages and/or proficiency levels to help each student learn through a more personalized format.

Figure 8:
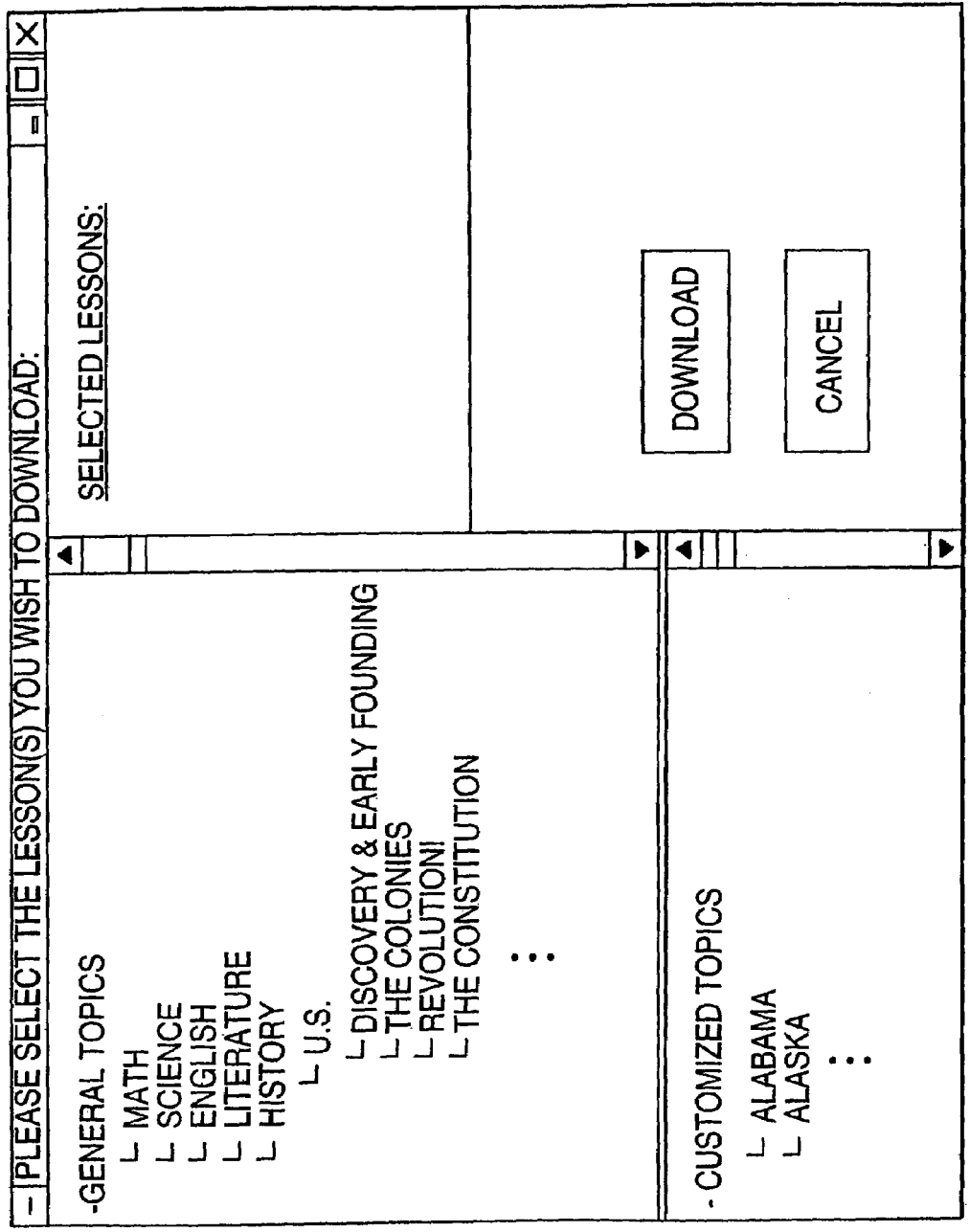
FIG. 8 is an exemplary download screen for an embodiment of the present invention.

Remote source 706 might research to determine the individual subjects, and even the desired amount of detail to be given the subjects, for a number of different regions, states, schools, etc., and offer customized lesson plans to those schools. Customers, such as school districts, might pay a fee to receive these customized lessons, and may even subscribe to have customized lessons provided on a regular basis. For example, a school might pay a fee to have remote source 706 supply a weekly computer lesson on current events of particular interest to the school (based on its geographic region, or prominent industries in the school's area). The schools, and/or the teachers, may simply access the remote server 706 whenever it wishes to download a new lesson. In one embodiment, a teacher may use computer 409 to access the Internet via external network 705, and download a selected lesson from remote server 706. The teacher's computer 409 may display an interface as seen in FIG. 8.

Alternatively, the remote source 706 might automatically send one or more lessons. The remote source 706 might send a particular customized lesson periodically. While remote source 706 might send the lesson electronically (e.g., via external network 705), the remote source 706 might also send the lesson in more traditional means, such as by magnetic or optical disk.

In this manner, a school may incorporate one or more lesson plans from remote source 706 into its annual curriculum. The remote source 706 may update its lesson plans to keep them current, and accordingly, the schools may rest assured that their students will be receiving the most up-to-date lessons. Different schools may pay different fees and/or subscription fees to obtain varying levels of service from remote source 706.

Although various embodiments are discussed above, it will be readily apparent to one skilled in the art that other embodiments are enabled without departure from the spirit and scope of the present disclosure. For example, various further combinations and subcombinations of the features described above are also suitable.

We claim as our invention:

1. A mobile computing system, comprising:
a portable cart having one or more wheels;
a portable computing device storage and charging area having one or more shelves in said cart, wherein internal batteries of a plurality of portable computing device are charged while said portable computing device are stored on said one or more shelves;
a battery storage and charging area in said portable cart, wherein a plurality of spare rechargeable batteries are separated from and not connected to said portable computing devices, and wherein said battery storage and charging area is a drawer;
a power supply in said portable cart, wherein said power supply recharges said plurality of rechargeable batteries; and
a wireless communication server in said portable cart, wherein said server is communicatively coupled to said plurality of portable computing devices via wireless communications when said portable computing devices are removed from said cart and distributed among a plurality of students for a teaching session, and wherein said shelves store said portable computing devices when said portable computing devices are returned to said cart after said teaching session.

2. The system of claim 1, wherein said power supply is a current-limiting power supply that reduces current draw when more devices are recharging.

3. The system of claim 2, further including one or more fuses for use during said recharging.

4. The system of claim 1, wherein said portable cart further comprises a battery changing station having a power supply line to provide electrical power to one of said computing devices while a battery in said one of said computing devices is changed.

5. The system of claim 1, wherein said server is communicatively coupled to a communications network external to said cart.

6. The system of claim 5, wherein said communications network external to said cart is a local area network.

7. The system of claim 5, wherein said communications network external to said cart is a telephone system.

8. The system of claim 1, wherein said battery storage and charging area is a drawer located above said one or more shelves.

9. The system of claim 1, wherein said server communicates with said portable computing devices while said portable computing devices are stored within said cart.

10. The system of claim 9, wherein said server updates software stored within said portable computing devices while said portable computing devices are stored within said cart.

11. The system of claim 1, further comprising one or more external folding shelves.

12. The system of claim 1, wherein said portable computing devices includes student portable computing devices and at least one teacher portable computing device, and wherein said server is communicatively coupled to said teacher portable computing device.

13. The system of claim 12, wherein said teacher portable computing device monitors said student portable computing devices.

14. The system of claim 13, wherein said teacher portable computing device is configured to assume control over one or more of said student portable computing devices.

15. The system of claim 12, wherein said student portable computing devices include computer-readable media storing computer-readable instructions which, when executed by one or more processors of said student portable computing devices, causes said student portable computing devices to administer an examination to students.

16. The system of claim 1, wherein said portable computing devices are laptop computers having an elongated battery extending across a front of said computer.

17. The system of claim 1, wherein said portable computing devices are laptop computers having a built-in radio frequency antenna.

18. The system of claim 1, wherein said portable computing devices are configured for use by a plurality of students in a classroom, and are stored on said one or more shelves when not in use by said students.

19. The system of claim 18, wherein said portable computing devices include a keyboard, a display, and an antenna.

20. The system of claim 1, wherein said power supply recharges at least thirty-two batteries at one time.

21. A mobile computing system, comprising:
a portable cart having one or more wheels;
a first storage area having one or more shelves configured to store and recharge a plurality of computing devices;
a second storage area configured to store and recharge a plurality of spare rechargeable batteries for computing devices, wherein said rechargeable batteries are separated from and not connected to said computing devices during charging, and wherein said battery storage and charging area is a drawer;
current limiting circuitry to limit current drawn by the recharging of said rechargeable batteries stored in said second storage area; and
a wireless communication server in said portable cart, wherein said server is communicatively coupled to said plurality of computing devices via wireless communications when said computing devices are removed from said cart and distributed among a plurality of students for a teaching session, and wherein said shelves store said computing devices when said computing devices are returned to said cart after said teaching session.

22. The system of claim 21, wherein said computing devices are laptop computers, said first storage area having a power cord compatible with said laptop computers.

23. The system of claim 21, wherein said drawer includes a plurality of molded slots to assist in the proper seating of said rechargeable batteries.

24. The system of claim 21, wherein said first storage area is further configured to recharge internal batteries of said computing devices when said computing devices are stored in said first storage area, and while said second storage area recharges said rechargeable batteries separated from and not connected to said computing devices.

25. The system of claim 24, wherein said power supply is configured to limit current drawn by both said first storage area and said second storage area.

26. A mobile computer teaching method, comprising the steps of:
storing a plurality of portable computing devices in one or more shelves of a mobile cart, and a plurality of spare rechargeable batteries which are separated from and not connected to said portable computing devices in a drawer of said mobile cart;
distributing said portable computing devices to a plurality of students for a teaching lesson while said spare recharge batteries on stored in said cart;
distributing one of said portable computing devices to a teacher, wherein said teacher portable computing device and said student portable computing devices are communicatively coupled to a wireless communication server of said mobile cart, and said teacher portable computing device monitors said student portable computing devices during said teaching lesson;
charging said plurality of spare rechargeable batteries while said batteries are stored in said cart;
using a current limiting circuit to control current drawn by charging said batteries; and
replacing internal batteries of said portable computing devices with said spare rechargeable batteries when said internal batteries reach a low charge state from said lesson.

27. A system, comprising:
a portable case having an enclosure with one or more external folding shelves on a side end;
a plurality of wheels located at a bottom end of said case, and one or more handles located at a top end of said case;
first internal portion of the case having one or more shelves configured to store a plurality of portable computing devices and charging internal batteries of said portable computing devices while stored in said first internal portion;
a second internal portion of the case storing and recharging a plurality of spare rechargeable batteries for said portable computing devices, wherein said spare batteries being disconnected from said portable computing devices while stored in said second internal portion, and wherein said second internal portion is a drawer;
power supply located in said case to provide electrical power to one or more of said portable computing devices and said spare batteries stored within said case; and
a wireless communication server in said portable case, wherein said server is communicatively coupled to said plurality of portable computing devices via wireless communications when said portable computing devices are removed from said case and distributed among a plurality of students for a teaching session, and wherein said shelves store said portable computing devices when said computing devices are returned to said case after said teaching session.

* * * * *